US008498906B2

(12) United States Patent
Zmolek

(10) Patent No.: US 8,498,906 B2
(45) Date of Patent: *Jul. 30, 2013

(54) COLLABORATIVE PRODUCT TAXONOMY INSTANTIATION

(75) Inventor: John Zmolek, San Mateo, CA (US)

(73) Assignee: SAP AG, Walldorf (DE)

( * ) Notice: Subject to any disclaimer, the term of this patent is extended or adjusted under 35 U.S.C. 154(b) by 273 days.

This patent is subject to a terminal disclaimer.

(21) Appl. No.: 12/855,842

(22) Filed: Aug. 13, 2010

(65) Prior Publication Data

US 2010/0306079 A1   Dec. 2, 2010

Related U.S. Application Data

(62) Division of application No. 10/404,600, filed on Mar. 31, 2003, now Pat. No. 7,797,203.

(51) Int. Cl.
*G06F 17/30* (2006.01)

(52) U.S. Cl.
USPC ......................................................... 705/26.61

(58) Field of Classification Search
USPC ............................. 705/26.1, 28, 26.61; 700/95
See application file for complete search history.

(56) References Cited

U.S. PATENT DOCUMENTS

| | | | |
|---|---|---|---|
| 6,324,522 B2 * | 11/2001 | Peterson et al. | 705/28 |
| 6,377,937 B1 * | 4/2002 | Paskowitz | 705/26.82 |
| 6,625,619 B1 * | 9/2003 | McClendon et al. | 1/1 |
| 6,678,695 B1 * | 1/2004 | Bonneau et al. | 1/1 |
| 6,687,557 B2 * | 2/2004 | Ouchi | 700/95 |
| 6,751,600 B1 * | 6/2004 | Wolin | 706/12 |
| 6,789,252 B1 | 9/2004 | Burke et al. | |
| 6,795,819 B2 * | 9/2004 | Wheeler et al. | 707/691 |
| 6,938,038 B2 * | 8/2005 | Weinberg et al. | 1/1 |
| 6,981,040 B1 * | 12/2005 | Konig et al. | 709/224 |
| 7,127,458 B1 * | 10/2006 | Mantripragada et al. | 1/1 |
| 7,610,211 B2 | 10/2009 | Casati et al. | |
| 8,086,643 B1 * | 12/2011 | Tenorio | 707/802 |
| 2002/0035555 A1 * | 3/2002 | Wheeler et al. | 707/1 |
| 2002/0087510 A1 * | 7/2002 | Weinberg et al. | 707/1 |
| 2003/0115115 A1 * | 6/2003 | Ouchi | 705/27 |
| 2003/0187757 A1 * | 10/2003 | Ouchi | 705/28 |
| 2003/0236677 A1 | 12/2003 | Casati et al. | |
| 2004/0015378 A1 | 1/2004 | Casati et al. | |
| 2004/0193506 A1 | 9/2004 | Zmolek | |

OTHER PUBLICATIONS

Boeri, Robert, Keys to KM: Selecting a search system, EContent, Mar. 2003.*
Boeri, Robert, "Keys to KM: Selecting a Search System", E Content, Mar. 2003.
© 2000 RosettaNet, Global Trade Item Number, GTIN, Tech Dictionary, US/SPSC, D-U-N-S® Issue 01.00.00, Implementation Guide, pp. i, ii, 1-16, May 4, 2000.

(Continued)

*Primary Examiner* — Mark Fadok
(74) *Attorney, Agent, or Firm* — Kenyon & Kenyon LLP

(57) ABSTRACT

A method forms a collaborative product taxonomy instantiation by starting with or defining a base taxonomy instantiation and collaborating between trading parties to negotiate a collaborative product taxonomy instantiation. The taxonomy instantiation comprises a set of characteristics and values of a desired product. The method assigns a set of characters to the collaborative product taxonomy instantiation. The method uses the set of alphanumeric characters in an electronic trade exchange between a buyer software application and a seller software application. The seller software application may determine whether it has a product that is equivalent to the collaborative product taxonomy instantiation.

30 Claims, 12 Drawing Sheets

OTHER PUBLICATIONS

© 2001, 2000 RosettaNet, PIP2A9: Query Technical Product Information, PIP® Version Identifier: vol. 1, pp. 4-6, Nov. 1, 2002.

A Delphi Group White Paper, Taxonomy & Content Classification, © 2002 Delphi Group, pp. 2-59.

Adams, Katherine, The Semantic Web, Differentiating Between Taxonomies and Ontologies, Online, vol. 26, No. 4, pp. 20-23, Jul./Aug. 2002.

Jacobs, J. et al., Semantic Web Technologies Take Middleware to Next Level, © 2002 Gartner Research, T-17-5338, pp. 1-4, Aug. 20, 2002.

Linden, A., The Semantic Web: Trying to Link the World, © 2001 Gartner Research, T-14-2779, pp. 1-6, Aug. 30, 2001.

Port, Otis, "Web", BusinessWeek, pp. 94-99, Mar. 4, 2002.

R/C Variant Configuration (LO-VC) Material Variants, SAP Library of on-line system documentation, http://help.sap.com, pp. 1-2, Sep. 23, 2002.

Requisite Technology, BugsEye®/eCM and eMerge® 3.5 Printable Version of Online Help, Doc. ver. 1.01, pp. 146-149.

* cited by examiner

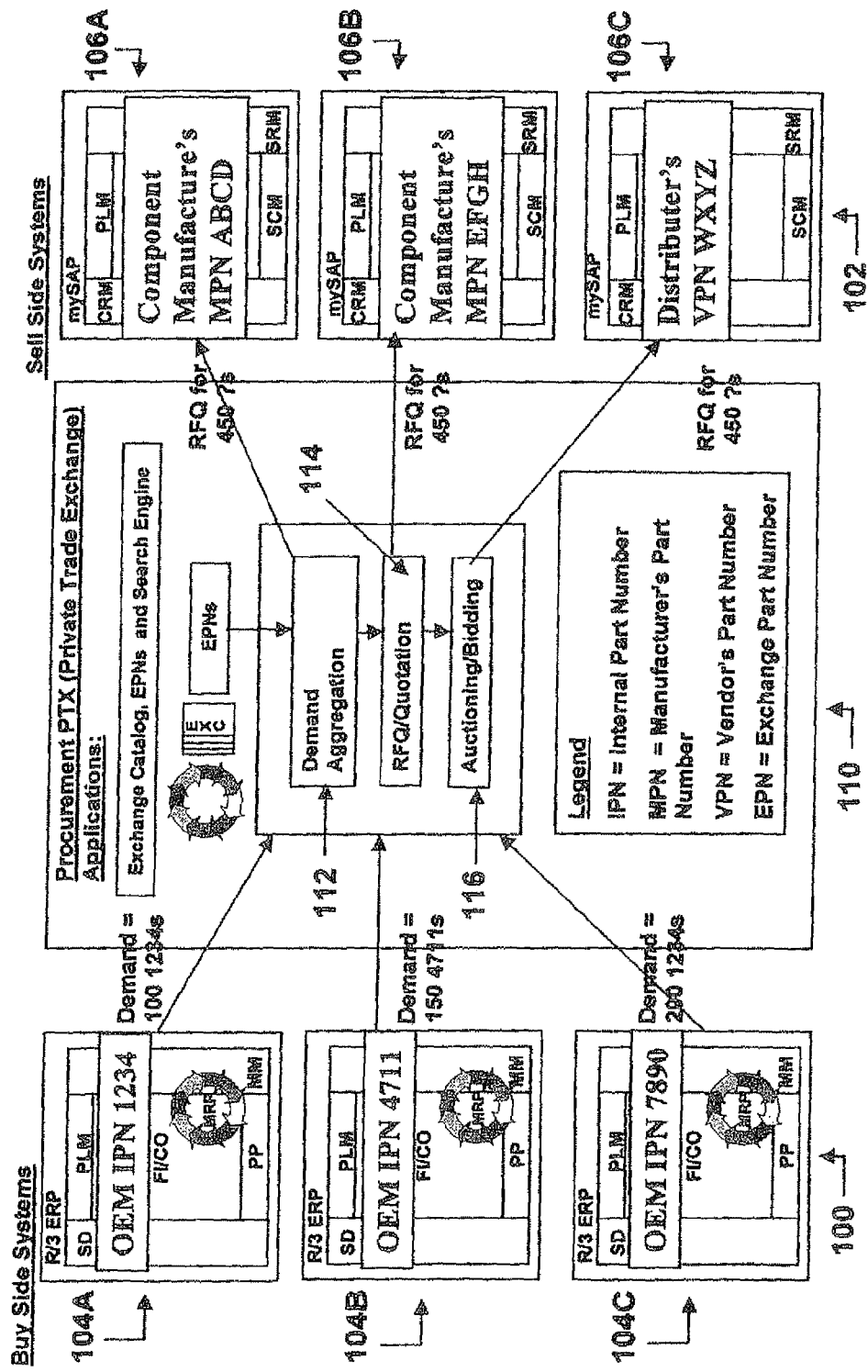
Figure 1: Multiple Part Numbers on Buy Side and Sell Side for FFF Equivalent Products (e.g. DRAM) Constrain Use of PTX Applications

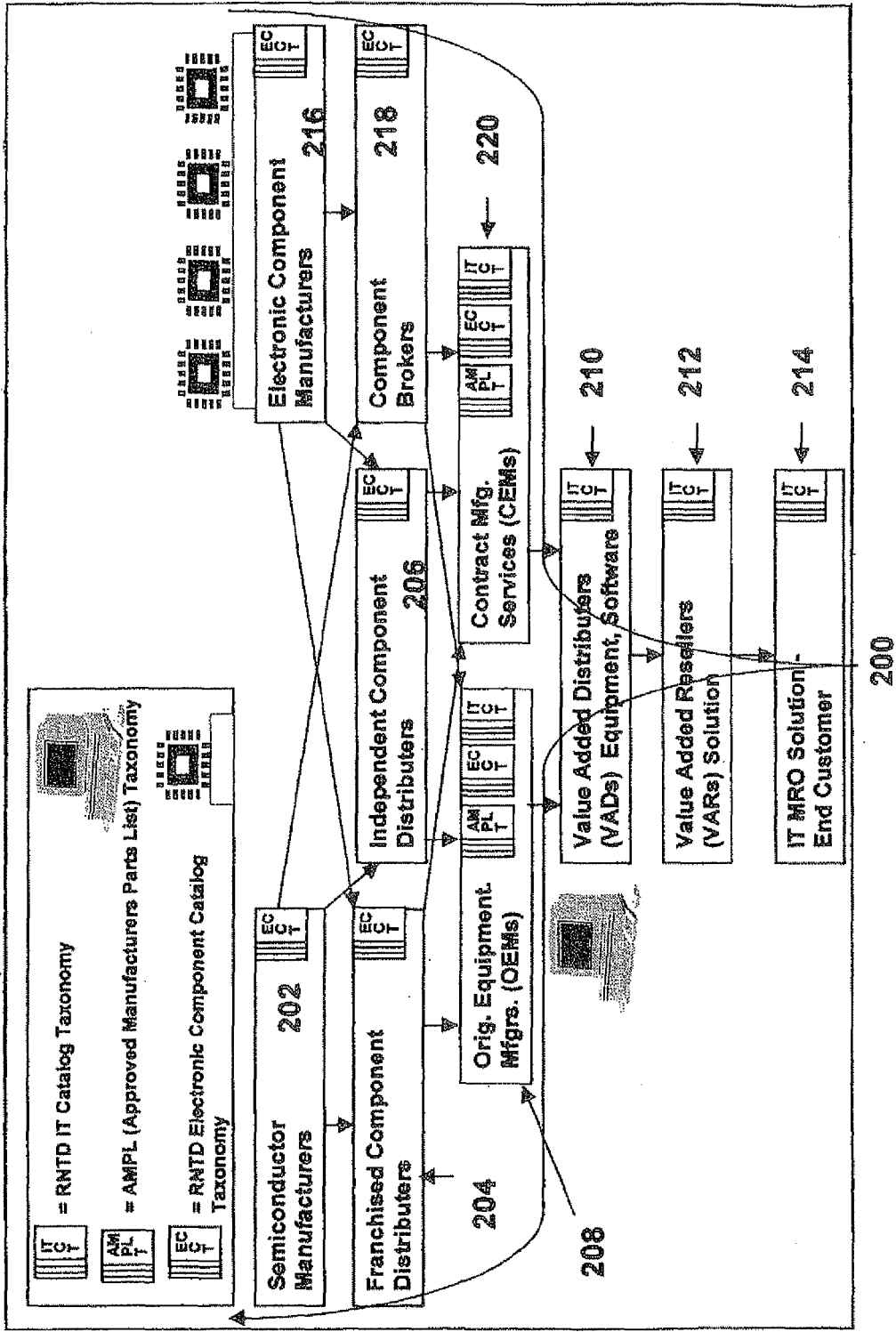
Figure 2: Positioning of RNTD Taxonomy-Based Catalogs and AMPLs in the High Tech Industries Supply Chain

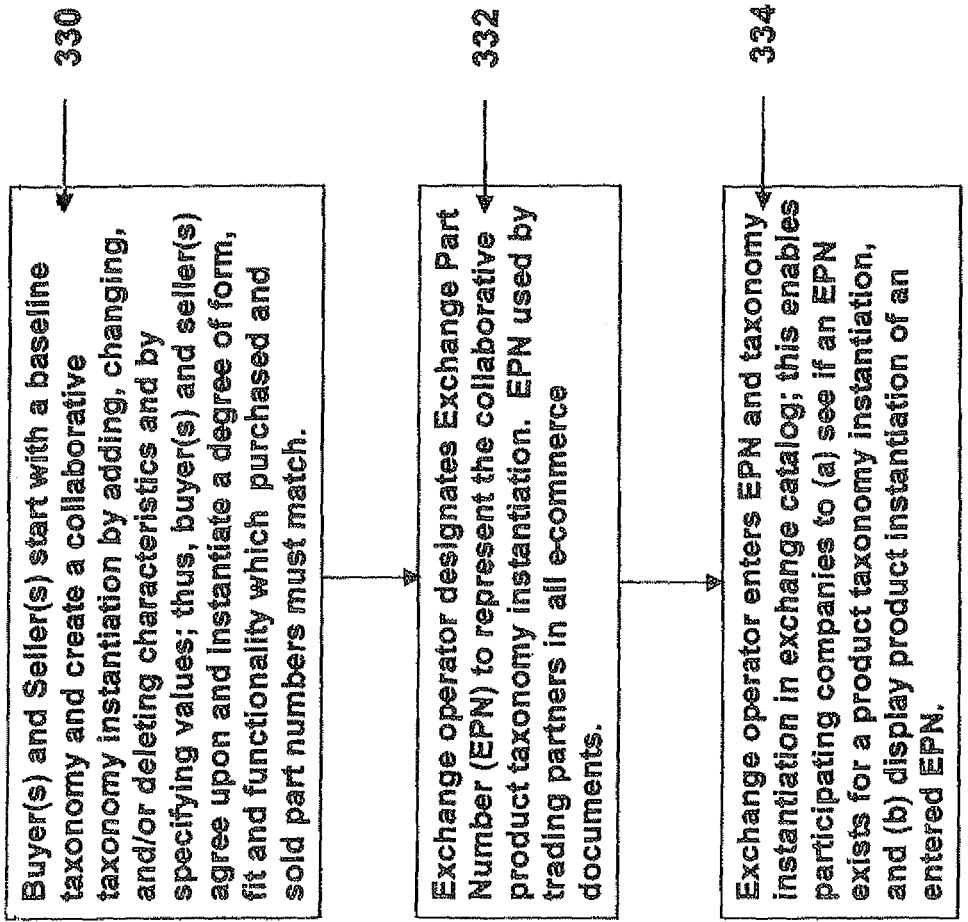
Figure 3A: Collaborative Product Taxonomy Instantiation Process

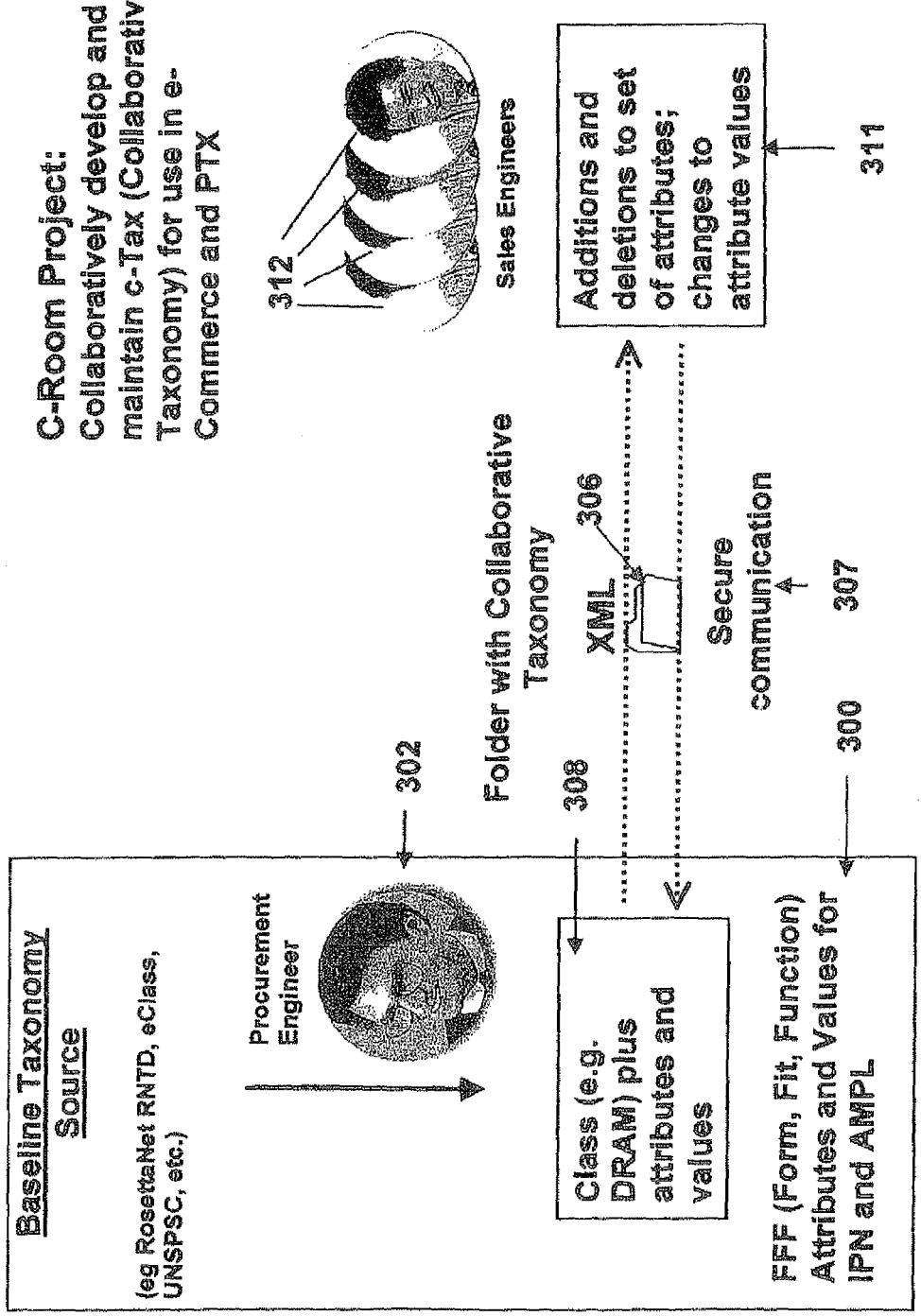
Figure 3B: Product Taxonomy Collaboration Using PLM Collaborative Folders

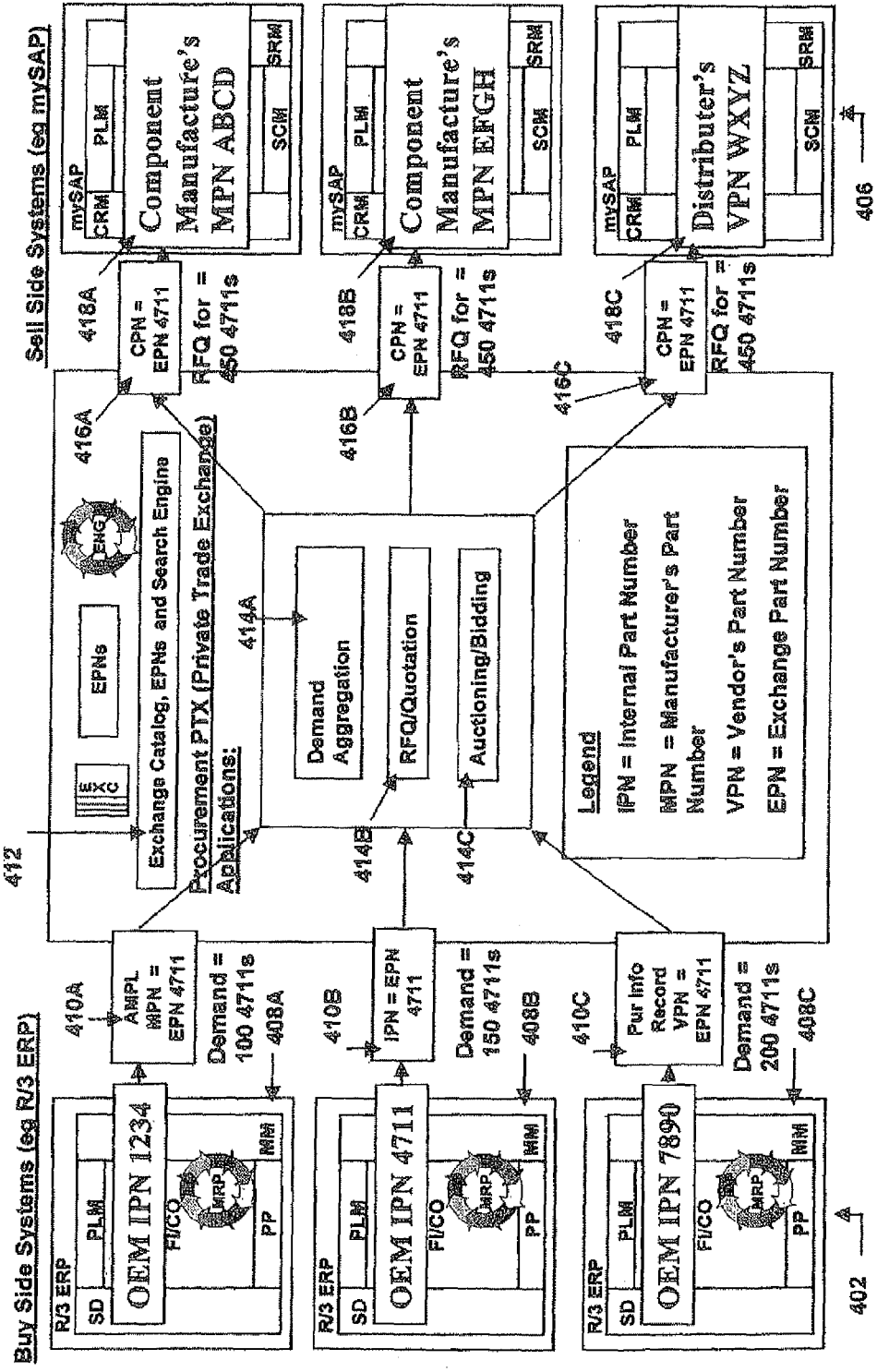

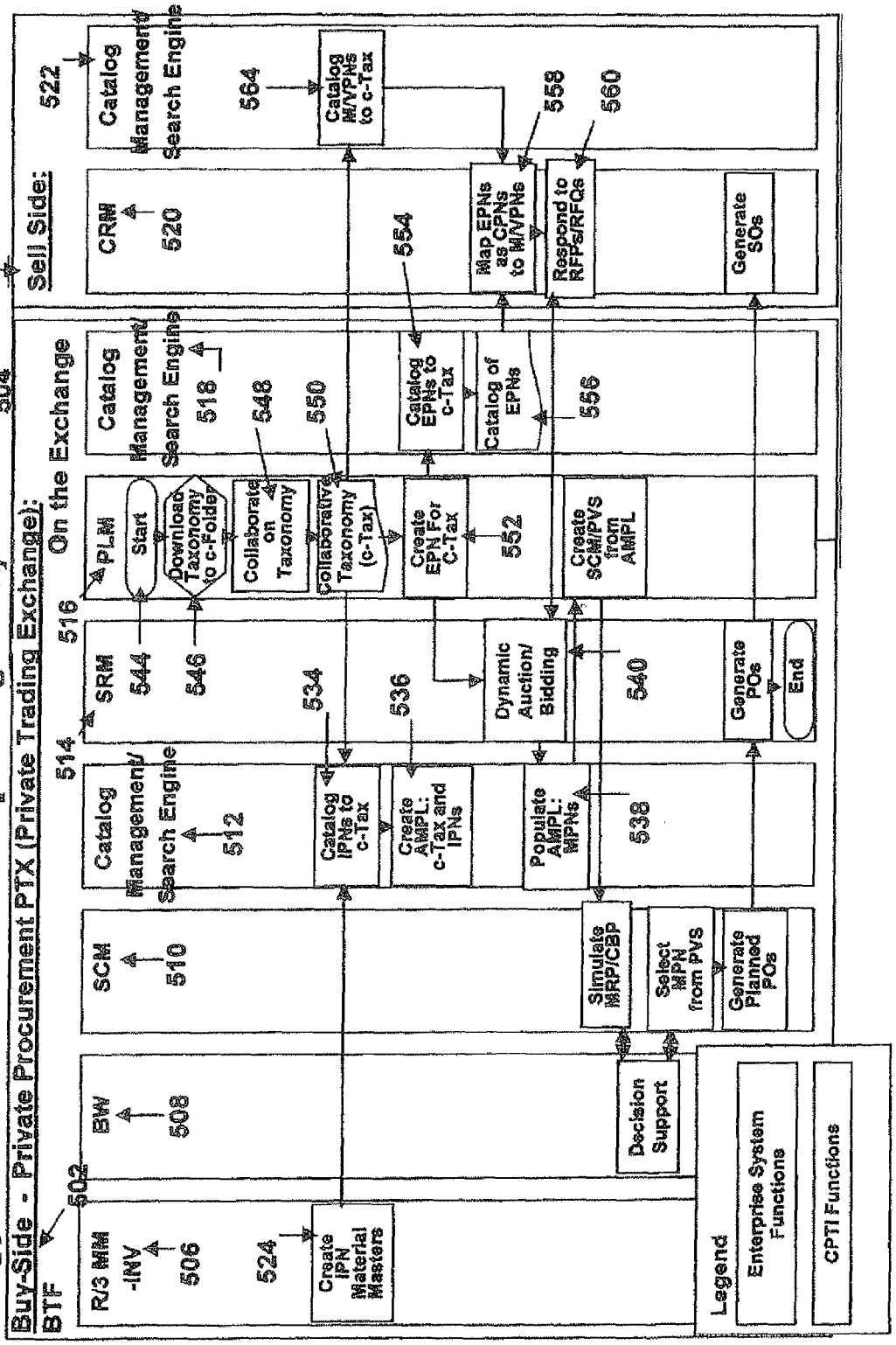

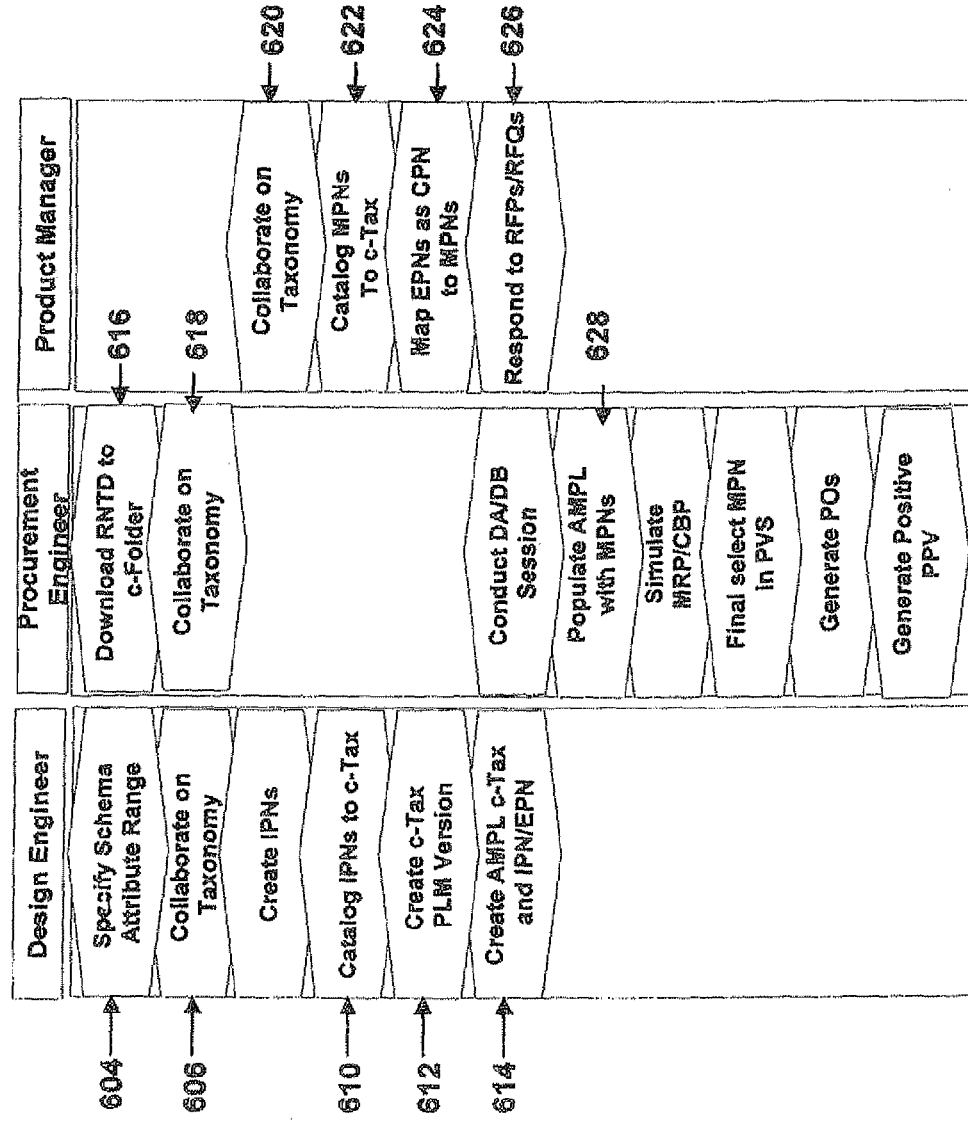
Figure 6: xPTM (cross application Product Taxonomy Management) Process – User Roles View 600

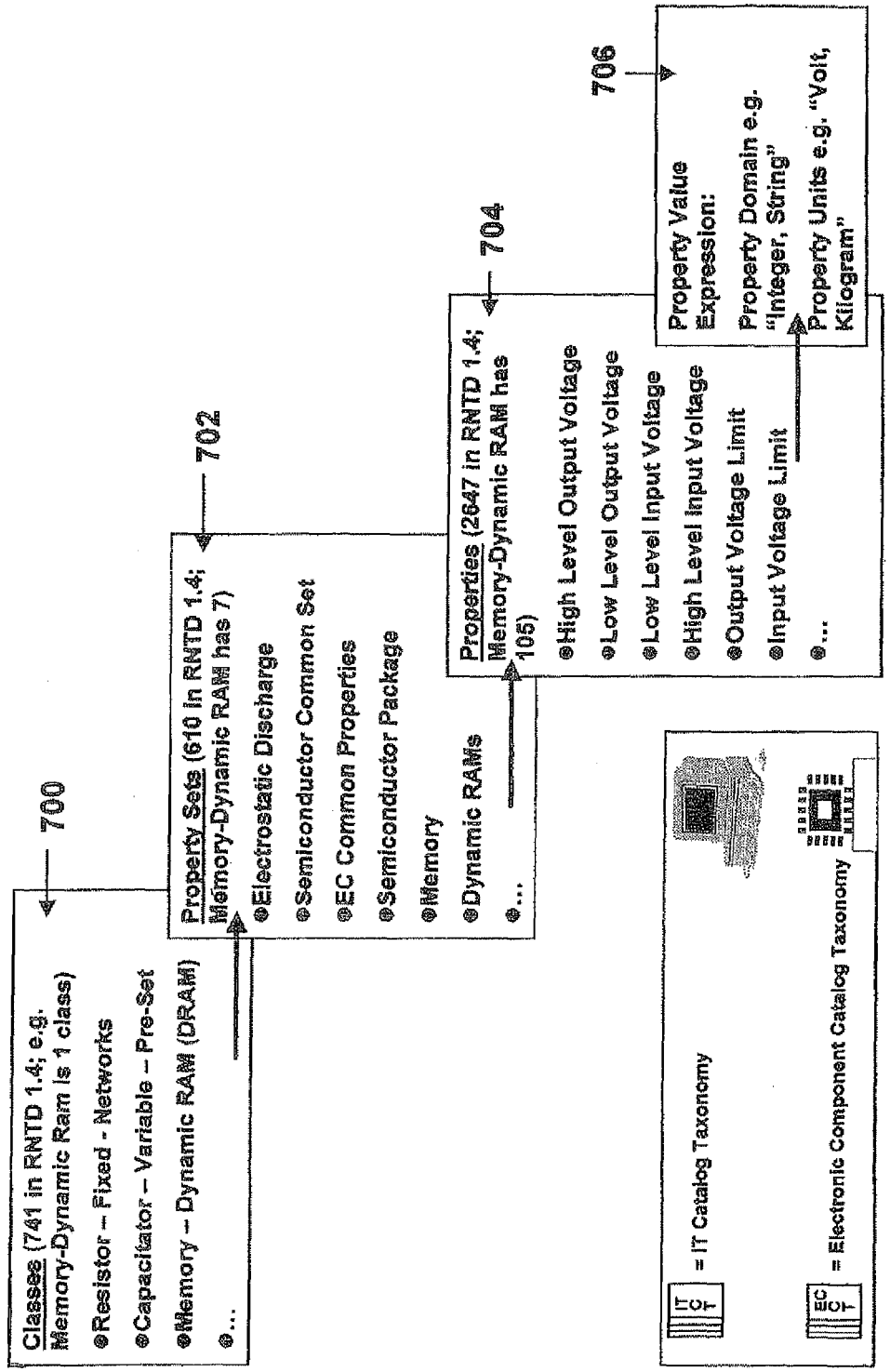
Figure 7: RosettaNet RNTD 1.4 Taxonomy for IT Equipment and EC (Electronic Components) Extract

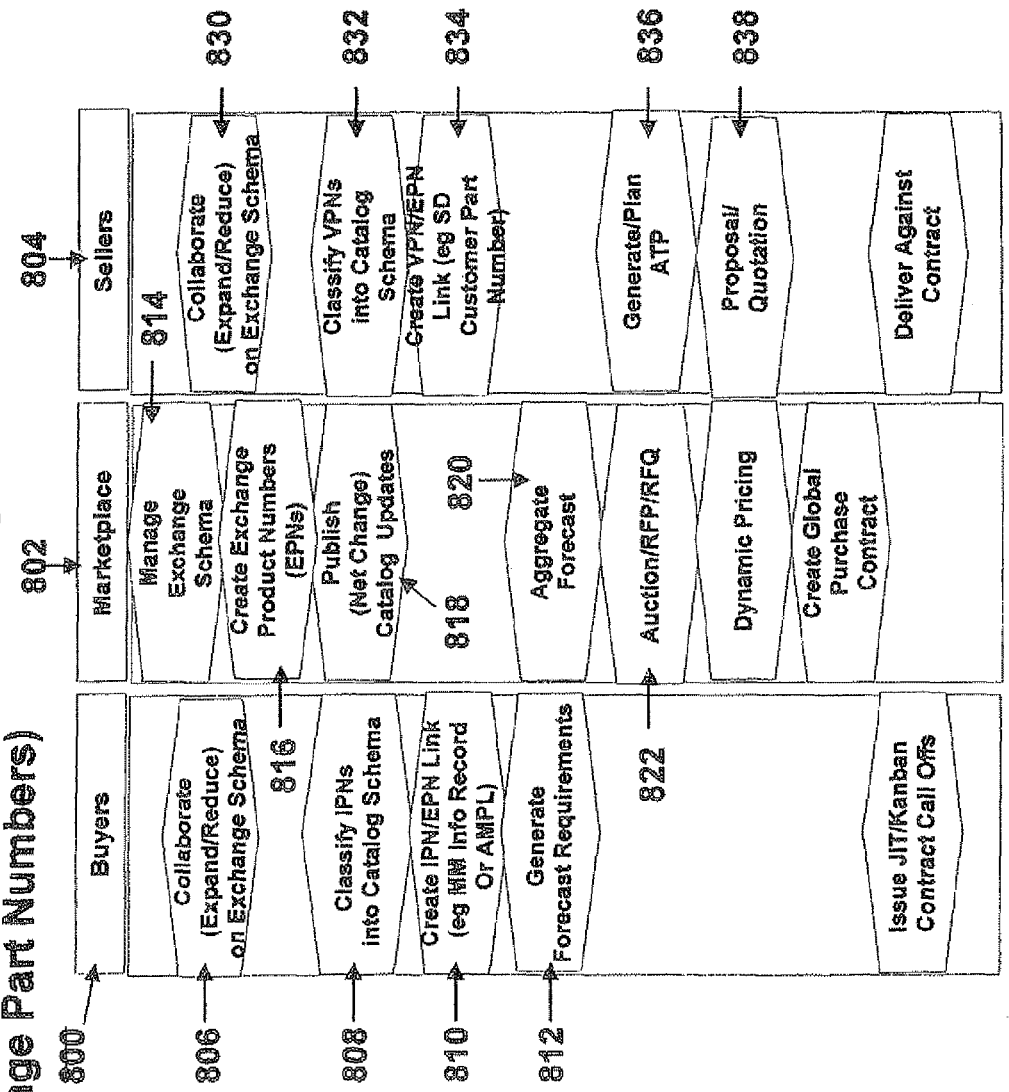

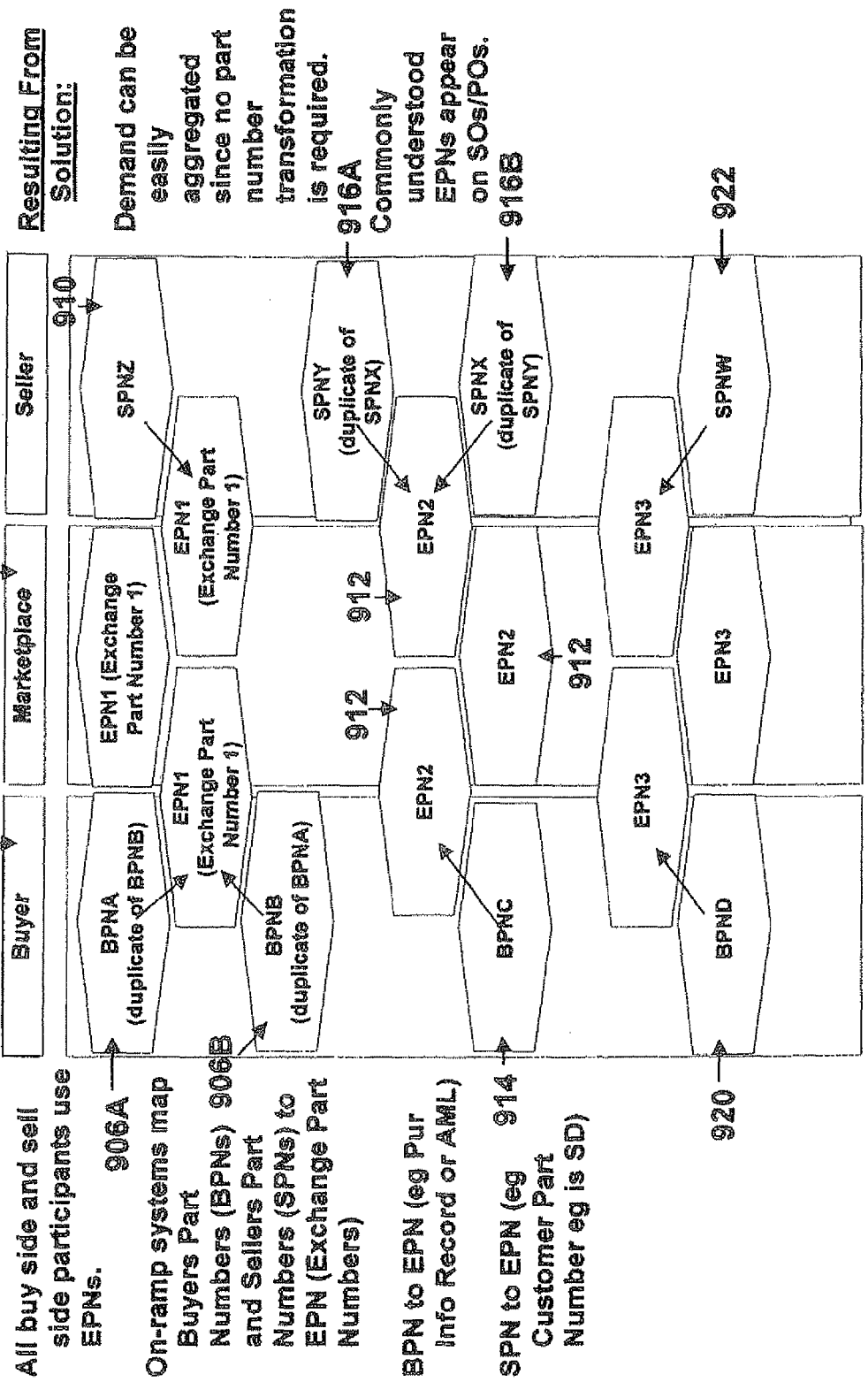
Figure 9: Mapping of Buyer and Seller Part Numbers to EPNs (Exchange Part Numbers) Which Result From CPTI Process

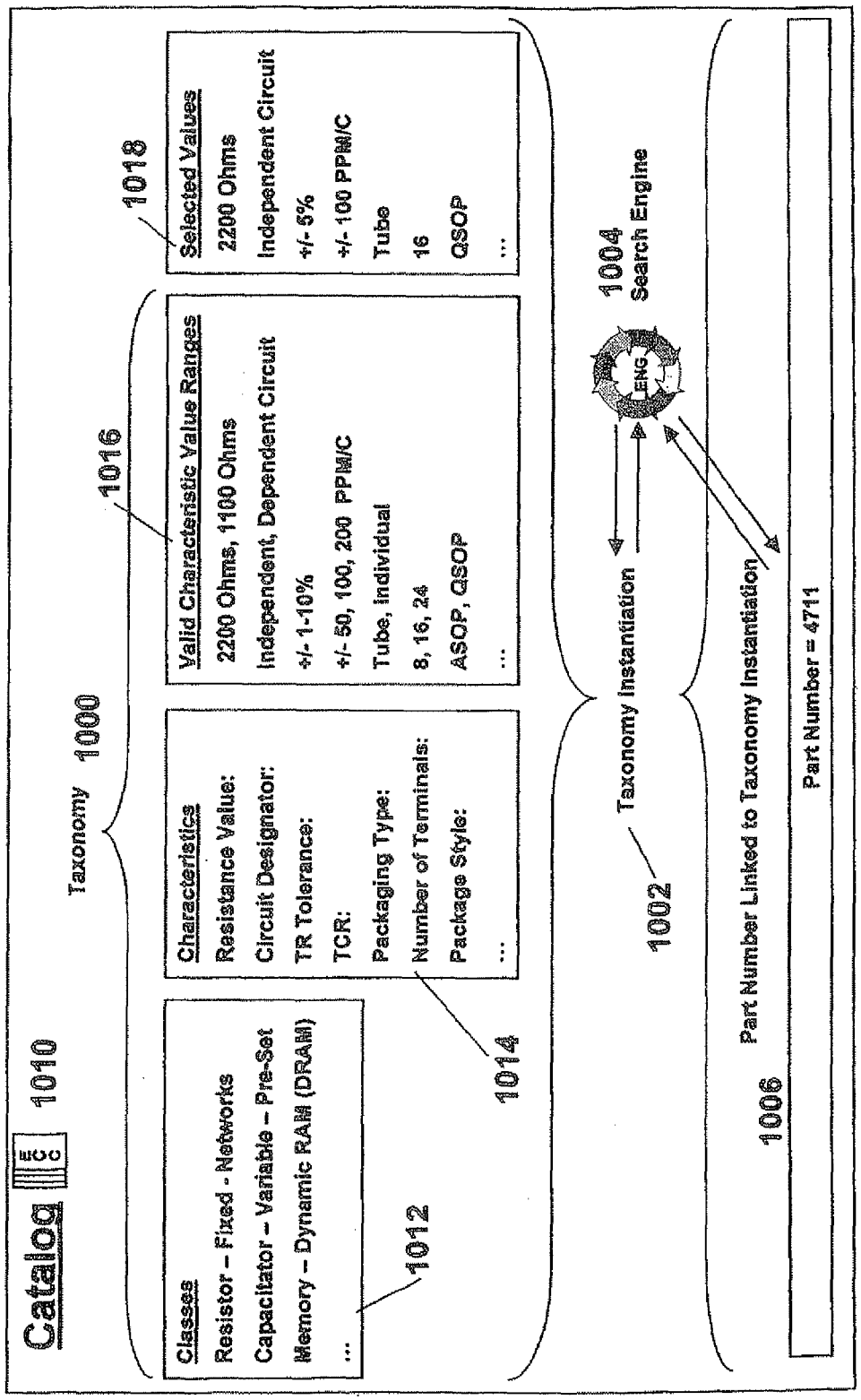

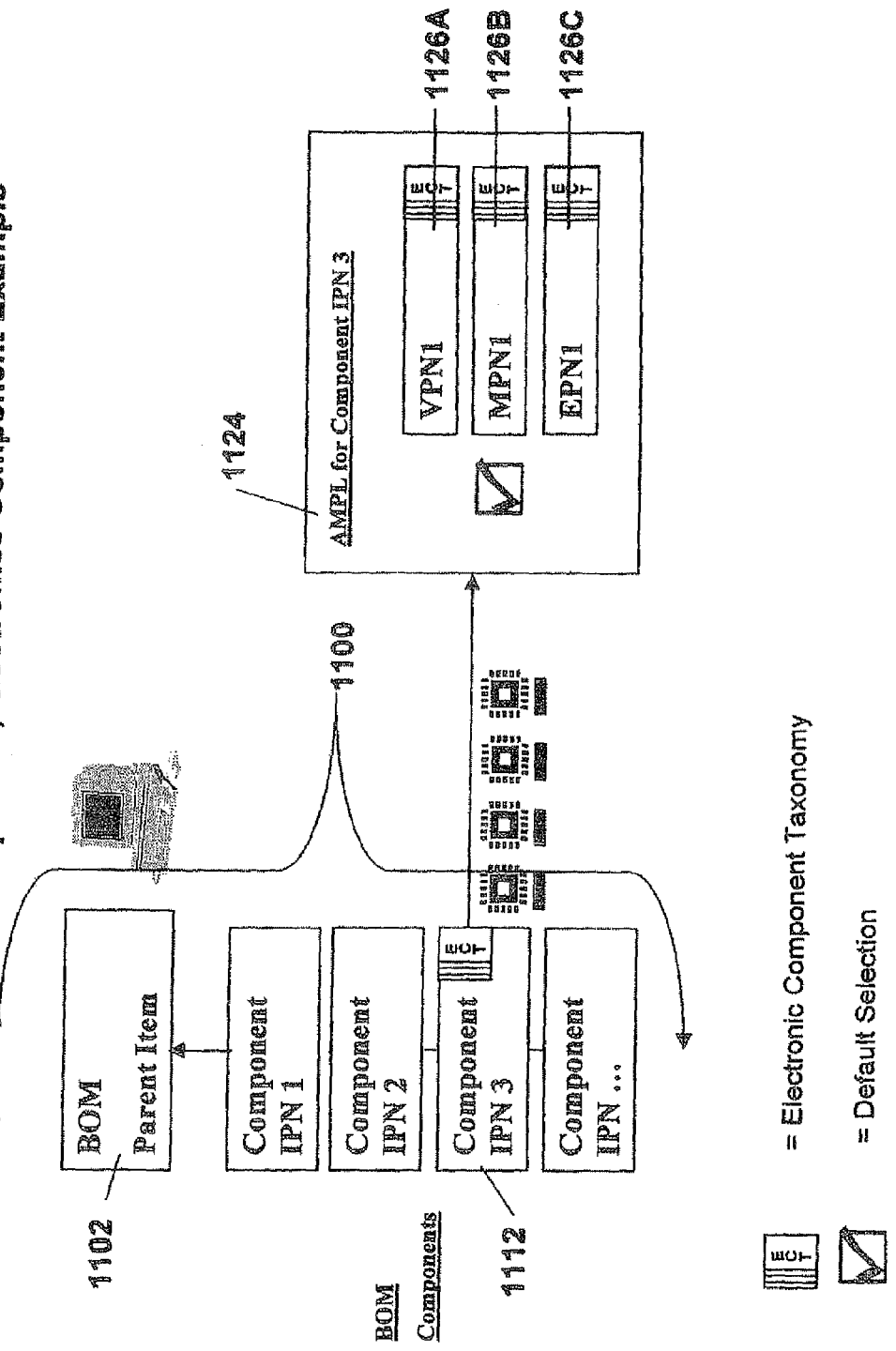
Figure 11: AMPL (Approved Manufacturers Parts List) for an IPN (Internal Part Number) – Buy Side Perspective, Electronics Component Example

COLLABORATIVE PRODUCT TAXONOMY INSTANTIATION

CROSS-REFERENCE TO RELATED APPLICATIONS

This application is a divisional of and claims priority under 35 U.S.C. §120 to U.S. patent application Ser. No. 10/404,600, filed on Mar. 31, 2003, and entitled "Collaborative Product Taxonomy Instantiation," which is herein incorporated by reference in its entirety.

BACKGROUND

The following disclosure relates to systems for buying and selling direct materials and stockable Maintenance, Repair and Operations (MRO) materials. "Direct materials" are raw materials and components used to manufacture products. "Stockable MRO materials" are replacement parts or spare parts for components, products, assemblies and subassemblies of capital equipment used by manufacturing companies. Some enterprises use electronic commerce (e-commerce) technology, such as e-selling and e-procurement applications, to buy and sell direct materials and stockable MRO materials. This buying and selling can occur in (a) B2B (Business to Business) scenarios where a single buying entity engages in e-commerce with a single selling entity, and (b) public or private trading exchange-based scenarios where multiple buying entities engage in e-commerce with multiple selling entities.

Both direct materials and stockable MRO materials are often modeled as internal part numbers (IPNs) (also called part identifiers, product numbers or product identifiers) in both buyers' and sellers' computer systems. An enterprise computer system's product lifecycle management (PLM) component may generate part numbers internally. Part numbers of direct and stockable MRO materials in behind-the-firewall (BTF) enterprise computer systems carry information that trigger enterprise and e-commerce system application logic, such as pricing, costing, planning, and inventory management. Internal part numbers generally have no inherent meaning outside of the firewall (OTF) of the enterprise systems landscape.

Outside the firewall (OTF) means outside an enterprise's computer security system. Inside the firewall (ITF) or Behind the Firewall (BTF) is inside an enterprise's computer security system.

A key obstacle in business-to-business (B-to-B or B2B) e-commerce in public and private sales and procurement exchanges (PTXs) is that participating purchasing and selling entities do not understand each other's product identifiers, i.e., part numbers. For example, a company that makes computers may use its own internal part number (IPN) for a part to be purchased. A supplying manufacturer may have a Manufacturers Part Number (MPN) for a form, fit, function equivalent part. A supplying distributor may have its own Vendor Part Number (VPN) for a form, fit, function equivalent part. Use of heterogeneous, independently generated product identifiers by purchasing and selling entities for materials that may be FFF (Form, Fit, Function) equivalent results in semantic disconnects between the purchasing and selling entities during automated e-commerce processes. This semantic disconnect requires intervention and participation of technical experts in buying and selling entities to determine whether parts that buyers want to buy and parts that sellers want to sell are form, fit and function equivalent. This participation and manual intervention by experts to determine FFF equivalency slows down and adds to the cost of industrial commerce that involves direct and stockable MRO materials.

FIG. 1 illustrates examples of buy side applications 100, sell side applications 102 and a plurality of procurement, private trade exchange (PTX) based applications 110. The PTX applications 110 may include a demand aggregation application 112, a request for quotation (RFQ)/Quotation application 114, and an auctioning/bidding application 116.

In the private procurement trading exchange (PTX) 110, a procuring entity 100 may deploy multiple buy-side enterprise systems 104A-104C. Alternatively, the systems 104A-104C may represent computer systems of multiple enterprises. The procuring entity's systems 104A-104C may have more than one part number for parts that are form fit function (FFF) equivalents. Similarly, for the multiple sell-side participants 106A-106C, each sell-side participant 106 may have a different part number for parts that are form, fit, and function equivalents.

Buyers 104A-104C on the buy side 100 and sellers 106A-106C on the sell side 102 may have multiple part numbers for form, fit and function (FFF) equivalent products. A part's form, fit and function (FFF) equivalent is defined by a set of specifications, which may be represented as a taxonomy instantiation. For example, a computer manufacturer 104B on the buy side 100 may identify an electronic component, e.g., a dynamic random access memory (DRAM), which the manufacturer 104B wishes to buy, with a part number "4711" in the manufacturer's enterprise computer systems. A supplier 106C on the supply side 102 may internally call its DRAM product "WXYZ" in the supplier's computer systems. These internal part numbers (IPNs) may be linked to each company's internal software applications, such as financials, inventory, sales, etc.

When manufacturers 104A-104C buy components and materials from suppliers 106A-106C, it is important that the suppliers' parts (e.g., "WXYZ") be form, fit and function (FFF) equivalents to the part (e.g., "4711") required by a buyer 104. While there might be thousands of DRAM products available in the global electronic marketplace, none or few products may be a FFF equivalent to what the buyer 104 needs.

A computer manufacturer 104 may wish to electronically solicit potential additional sources of supply for DRAM by using an e-procurement system to send RFQs to potential new suppliers 106A-106C around the world. A problem arises when the potential sources of supply, i.e., companies 106A-106C that manufacture or distribute DRAM, do not recognize "4711" since each supplier 106 has its own part numbers for DRAM products. A supplier 106 receiving an electronic request for quotation (RFQ) 114 for part number "4711" would have no way of knowing what the part number "4711" represents, unless additional information is available. Similarly, a buyer 104 receiving a solicitation to buy "WXYZ" from a supplier 106C would have no way of knowing whether the "WXYZ" part is an FFF equivalent to "4711."

Free form product specifications (text) that accompany a product or RFQ do not solve the problem because specifications developed by the buyer 104 may not map directly to specifications developed by a seller 106. Free form text may also require people to read and process the text.

The product semantics disconnect (different part number problem) constrains buyers 104A-104C from finding additional sources of supply in the global electronic marketplace, and constrains suppliers 106A-106C from electronically promoting their products to buyers 104A-104C. Especially in exchange environments 110, heterogeneous part numbering constrains applications like demand aggregation 112, electronic auctioning and bidding 116 and electronic RFQ/quotation exchanges 114, because these applications may require a single part number to process.

In addition, as illustrated in FIG. 1, a large or diverse buying entity on the buy side 100 may have different part numbers in different divisions 104A-104C for FFF equivalent items due to mergers, acquisitions and legacy part numbering systems. Also, specifications for the different products may have been developed at different times by different engineers and may not be consistent.

Today, the problem of determining FFF equivalency is addressed through procedures and additional human-to-human communications between buyers 104A-104C and sellers 106A-106C. But the procedures and additional human-to-human communications limit the speed and efficiency of the buy/sell process, and fail to take advantage of the potential vast productivity gains to be realized through e-commerce on the World Wide Web (WWW).

Supply Chain FIG. 2 illustrates an example of a supply chain 200. The supply chain 200 includes manufacturers 202, franchised component distributors 204, independent component distributors 206, original equipment manufacturers (OEMs) 208, value added distributors (VAD) 210, value added resellers 212, an end customer 214, component manufacturers 216, component brokers 218 and contract manufacturing services (CMS) or contract electronics manufacturer (CEM) 220. FIG. 2 also depicts the use of the Electronic Component (EC) catalog taxonomy (ECCT) and the Information Technology (IT) catalog taxonomy (ITCT) segments of a version of the RosettaNet Technical Dictionary (RNTD).

A CEM is a provider of manufacturing services to original equipment designers (OEDs). Component manufacturers may send part specifications to the OED. The OED sends documents to the CEM, including the OED's approved manufacturer parts list (AMPL) and "customer (from the CEM's perspective) bill of materials (BOM) (see FIG. 11)." The CEM's customer the OED, and from the OED's perspective, customer BOMs are OED-created BOMs using the OED's Internal Part Numbers (IPNs). Cross reference of customers' AMPLs and BOMs provide information to the CEM as to which parts (e.g., MPNs and/or VPNs) can be purchased in order to manufacture equipment for the OED, based on the OED's BOM.

The OEMs 208 and CEMs 220 may buy components from the distributors 204, 206 and component brokers 218, who buy the components from the semiconductor manufacturers 202 and electronic component manufacturers 216. In some cases, the OEM 208 may buy components directly from the electronic component manufacturers 216. CPTI may enable OEMs 208, OEDs and CEMs 220 to more easily buy directly from component manufacturers 216, rather than purchasing via distributors 206.

In some cases, distributors 206 provide the added value of helping buyers identify sources of supply or sellers identify customers for FFF specific components. Distributors 206 may create knowledge of which part numbers may be FFF equivalents.

The semantics disconnect problem may compound at each level of the global industry supply chain 200. For example, a manufacturer's part number (MPN) of a component manufacturer 202 (e.g., semiconductor manufacturer) is often given different vendor part numbers (VPNs) by distributors 204, 206 and component brokers 218. A manufacturer's part number (MPN) is a product ID given by a manufacturer to a component made by the manufacturer. The MPN is assigned by the component's original manufacturer, e.g., manufacturer 202. A variation of this is where an MPN's manufacturer is not the original manufacturer, but manufacturers a FFF equivalent to the original MPN, and assigns an MPN that is a recognizable variant of the original manufacturer's MPN.

A vendors' part number (VPN) is a product ID of a component assigned by a vendor. Technically, the vendor could be the manufacturer, and therefore the VPN could be the MPN. Typically, the term "vendor" applies to distributors, who may assign their own part numbers because the distributor/vendor may resell components from multiple manufacturers that are FFF equivalent and may sell these under one VPN identifier.

From a buying organization's perspective, an internal part number (IPN) may be a product identifier for a procured, stockable (inventoried) material or component. For example, in the SAP R/3 Enterprise Resource Planning (ERP) system, an IPN may represent a "material master" object, which is a master record or representation of a product. The material master may have a raw or purchased material type. The material master identifier may be the same as a part ID or a product identifier. If an item is stockable, like direct materials or stockable MRO, then the item may be identified in the system as a material master before any transactions for the material item can be performed by the system. The system needs information from the material master to trigger application logic. A material master may be separated into different "views," such as a basic data view (e.g., with description and unit of measure), a sales view (e.g., with sales prices and sales unit of measure), a planning view (e.g., with reorder point and MRP parameters), a costing view (cost), etc.

A "material master" in SAP's R/3 system may be known by another term in other enterprise or e-selling or e-procurement systems. For example, in SAP's e-procurement system Enterprise Buyer Professional (EBP), part numbers created in the system are called "product masters." In stockable maintenance, repair and operations (MRO) environments, the IPN is the identifier (ID) under which procured equipment spare part components are stocked. In direct material environments, the IPN is used to manage stocked materials and is also the ID for procured components in a bill of materials (BOM).

Original equipment manufacturers (OEMs) 208 are original designers and manufacturers of equipment, which can be assembled from procured mechanical, electrical and passive components. Original equipment manufacturers (OEMs) 208 have internal part numbers (IPNs) for components in their bills of materials (BOMs). Each of these IPNs may be linked to an approved manufacturers list (AML) (known in SAP R/3 as an Approved Manufacturers Part List (AMPL), and in some other systems, an AVL (Approved Vendors List)) (see AMPL 1124 in FIG. 11). The AMPL 1124 contains multiple FFF equivalent MPNs, VPNs and/or EPNs 1126A-1126C that have been pre-approved for purchase, typically by a procurement engineer, when a net requirement exists for the IPN to which the AMPL has been linked. By definition, each MPN, VPN, or EPN in the AMPL is interchangeable or an FFF equivalent to the IPN, i.e., share a set of common specifications or attributes. All approved part numbers in the AMPL should function properly when used in the product manufactured under a BOM, or when used as a replacement part in the product.

A contract manufacturer (CM) 220 in FIG. 2 may need to maintain BOMs of IPNs with associated AMPLs for multiple OEM customers in the CM's system. The OEM customers can easily have different IPNs for items that are FFF equivalent. These IPNs from different OEMs 208 will have different AMPLs, which may often have a high degree, but not total, overlap. For example, an AMPL for one OEM's IPN may contain some MPNs or VPNs which are also included in AMPLs for other OEMs IPNs.

In manufacturing industries, net materials requirements planning (MRP) is performed on the IPNs in BOMs. A purchase order (PO) is generated for the IPN and the PO also contains one of the FFF-equivalent approved parts in the AMPL 1124. This allows the selling company to know which part number (e.g., the approved part number) is selected from the AMPL. A selected MPN 1126B is received into the buyer's inventory as a specific part number IPN3 1112, i.e., the identity of the MPN 1126B may be lost with the receipt-to-stock transaction. A purchasing company will often buy different approved parts from the AMPL 1124 with different POs. Thus, multiple, different approved parts 1126A-1126C may be carried physically in inventory under the IPN3. All of the approved parts 1126A-1126C in the AMPL 1124 should be FFF equivalents to the IPN3 1112. Otherwise, the approved parts 1126A-1126C may not function within the product (e.g., a computer) manufactured from components in the product's BOM structure 1100.

The term "approved" in AMPL indicates that each part listed in the AMPL has been tested and "approved" as being a FFF equivalent to the specifications or attributes of the IPN. Two MPNs with similar specifications are not necessarily FFF equivalent, since the specifications may not be precise enough to ensure that the parts are FFF equivalent. Thus, there is a need for an "approved" manufacturer's parts list (AMPL). Parts are usually designated as approved after testing to make sure they function properly in the equipment within which they are used.

GTIN

One proposed standard part numbering solution is the Global Trade Item Number (GTIN). A GTIN represents a specific manufactured product. The GTIN is a 14-character, non-intelligent, numeric identifier that includes a packaging code, a company code, a sequential identifier and a "check digit." It is identical to the EAN/UCC-14. There is a one-to-one correspondence between a GTIN and a specific manufactured product. A GTIN may be assigned sequentially by a manufacturer or a consortium. GTINs were designed for buyers and sellers to use the same part number throughout the supply chain, rather than each using their own, self-assigned part numbers. Thus, GTINs would streamline product information flow.

GTINs are limited because there is no semantic relationship between a part's GTIN and the part's FFF. If a buyer submitted an RFQ with a particular GTIN, the seller would not be able to easily or quickly derive the part's FFF to determine whether the seller had a product to offer. So while buyers can use seller's GTINs after they become known to a seller, a buyer RFQing a new supplier does not yet know the new seller's GTIN for the part that the buyer wants, or indeed whether the new seller has such a product. Nor can the new seller determine from the buyer's internal part number what the buyer wants to buy.

RosettaNet (see www.rosettanet.org) is a consortium of 400+ companies in the high tech and electronics industry. RosettaNet states that where a one-to-many relationship exists between a buyer's IPN and possible FFF equivalent part numbers from suppliers, the Approved Manufacturers List (AML) or Approved Manufacturers Part List (AMPL) may be used. The buyer can continue to use the same IPN, rather than using a supplier's GTIN as the buyers IPN. This is desirable for manufacturers because if the buying manufacturing company created IPNs using the sellers' GTINs, the buying manufacturing company may have multiple FFF equivalent IPNs. This may result in the buyer's MRP system generating a net requirements for a given IPN even though there might be available inventory of another FFF equivalent IPN. Thus, manufacturers may desire to use the AMPL rather than GTINs.

RosettaNet allows for use of GTINs for distributors and use of AMPLs for manufacturers. RosettaNet has defined a Partner Interface Process (PIP) for the AML, aka AMPL (Approved Manufacturers Parts List). The IPN with AML is more conventionally used in enterprise systems by electronics manufacturing companies than GTINs.

SUMMARY

The present application relates to the process of providing a Collaborative Product Taxonomy Instantiation (CPTI) as part of a collaborative taxonomy, which may be a component of a Cross Application Product Taxonomy Management (xPTM) system.

A CPTI of the invention eliminates semantic disconnects in direct materials and stockable MRO supply chains, which are caused by heterogeneous or disparate product identifiers, by providing a unifying identifier understood by the various parties to a communication. For ease of reference the unifying identifier will be referred to as an Exchange. Part Number (EPN) that may be an alphanumeric value. The CPTI process recognizes that trading partners (e.g., business enterprises) within commerce communities have different, mutually incomprehensible, part numbers for products that may be equivalent e.g., have the same form, fit and function (FFF). For ease of description FFF will be used to define equivalents for purposes of grouping objects under one EPN. CPTI enables trading partners and trading communities within global industry supply chains to more readily identify sources of supply (buy-side perspective) and potential customers (sell-side perspective) using e-commerce technology.

Furthermore, the present invention recognizes that developing the instantiations in a taxonomy requires collaborative discussions or negotiations between parties. Typically the discussions or negotiations take place electronically, e.g. over the internet, to allow more than two parties to easily access and propose changes to an instantiation, e.g., through the use of a collaborative folder or other exchange technology. As such, the present invention proposes using an existing base taxonomy as the starting point for collaboration. Each instantiation, defines an object (e.g., DRAMs) having certain attributes or parameters (e.g., voltage tolerances, temperature tolerances, footprint, speed, capacity), wherein at least some of the attributes have values associated with them (e.g., 5V, 80 degrees Celsius, etc.) The collaboration may relate to different aspects of the instantiation; e.g. to sub-grouping objects, adding or deleting attributes or adding or deleting value ranges.

xPTM involves the linking of the collaborative taxonomy to other applications, such as back end systems, to be integrated into the procurement, planning or other aspects of an enterprise logic system. As such xPTM may be used by design engineers (e.g., with PLM applications), and planners (e.g., with Supply Chain Management (SCM) applications) and by maintenance (Plant Maintenance (PM) applications). CPTI may be used with e-Commerce systems like e-procurement, e-Sales, Private Exchanges (PEXs or PTXs) and electronic bidding and auctioning applications.

Thus CPTI refines the concept of using standard taxonomies (e.g., the RosettaNet Technical Dictionary (RNTD, eClass or UNSPSC codes) (RosettaNet, Partner Interface Process, PIP, are trademarks of RosettaNet, a non-profit organization) to communicate FFF by adding at least two acts: (a) at least one buyer and seller collaborate to refine, customize and instantiate at least once a baseline standard taxonomy, i.e. create a collaborative product taxonomy instantiation, and (b) assigning an exchange part number (EPN) to represent the resulting collaborative taxonomy instantiation. The collaboration participants associate material master data with the resulting EPN in their respective e-commerce and e-selling systems and back office enterprise systems. EPNs resulting from the CPTI collaboration process are machine sensible after entry as material masters in the participants' systems. Machine sensible part numbers enable the e-commerce dialogue between the e-selling and e-procurement systems to be fully automated. There is no need for intervention of experts to interpret and manually enter the data in the recipients' systems, which is usually necessary when taxonomy instantiations, rather than recognizable part numbers, are sent from system to system.

Generally speaking, the World Wide Web has some limitations due to the semantic disconnects between communicating parties. Differences in terminology and other semantic differences provide a significant hurdle to free communication between parties. The term Semantic Web has been used to describe a Web where the semantic differences have been addressed. This state of Utopia has, however, not been realized in the past. The CPTI process discussed in the embodiment below may, on the other hand, be considered as a specific industrial application of Semantic Web ontology and taxonomy concepts. It will therefore be appreciated that, while the particular embodiment relates to semantic differences between buyers and sellers in naming their products, the invention is equally applicable to addressing other semantic disconnects by providing a collaborative environment and by mapping the communicating parties' terminologies to common key terms. For purposes of conciseness, a particular application of the invention will be discussed in detail below. The common key terms that serve as the link between the communication parties' terminologies will be referred to Exchange Part Numbers (EPNs). EPNs refer to a set of numbers, letters, a set of alphanumeric characters, or, in the case of Chinese, Japanese, or other non-alphabet based characters, a set of one or more characters. Since the common key words (in this case referred to as EPN) need not necessarily be viewable by a user, the EPNs could even be undefined characters (binary strings that are commonly used simply for the purpose of translating from one set of serial numbers to another). Typically, however, an EPN that is viewable and understandable by human users is preferable since it can be displayed to the communicating parties as confirmation that they are dealing with a product with the same attributes. In the embodiment discussed below, the EPN may enable automated e-procurement and e-selling of direct material components and stockable MRO materials via e-commerce documents in scenarios where buyers and sellers have different BTF part numbers for FFF equivalent items.

Buyers and sellers may be unable to understand each other's internal part numbers (IPNs), vendor part numbers (VPNs), manufacturer's part numbers (MPNs) and customer part numbers (CPNs).

Resolution of heterogeneous system product ID disconnects may enable electronic auctioning applications.

In an on-line collaboration to negotiate a CPTI the method may comprise selecting from a taxonomy a first set of attributes and values for a desired component; posting the first set of attributes and values to a collaborative environment; accessing a second set of attributes and values via the collaborative environment, wherein at least some of the attributes or values or both attributes and values in the second set are different from the first set; forming a taxonomy instantiation comprising at least some of the attributes and values from the first and second sets of attributes and values; and assigning a set of characters to the taxonomy instantiation.

Another aspect relates to a method comprising: forming a collaborative product taxonomy instantiation, the taxonomy instantiation comprising a set of characteristics or attributes of a desired product; assigning a set of characters to the collaborative product taxonomy instantiation; and using the set of characters in an electronic trading exchange application between at least one buyer and at least one seller.

Another aspect relates to an electronic commerce exchange configured to communicate with at least one product procurement software application and at least one product sales software application. The procurement software application has a first internal product identifier. The sales software application has a second internal product identifier. The invention associates a unifying identifier or key to the first and second internal product identifiers Another aspect relates to an electronic catalog comprising a plurality of collaborative taxonomy instantiations, each collaborative taxonomy instantiation comprising a plurality of characteristics and values, each collaborative taxonomy instantiation being linked to an exchange part number.

Another aspect relates to an electronic commerce document configured to be sent over the Internet between a component buyer and a component seller. The electronic commerce document includes an exchange part number. The exchange part number is associated with a collaborative product taxonomy instantiation.

Another aspect relates to a method comprising: accessing a catalog of collaborative taxonomy instantiations; and using an exchange product number to find its collaborative taxonomy instantiation with pre-determined characteristics.

CPTI may provide many advantages or benefits. For example, purchasing companies may be able to establish additional sources of supply, which may enable the purchasing companies to procure materials with shorter lead times and for less cost as a result of having a broader range of alternative suppliers. The purchasing company may manufacture products from procured components. The shorter lead times and/or lower costs resulting from CPTI may enable the purchasing company to in turn sell their manufactured products for lower prices or to deliver assembled products in less time.

Selling companies may be able to more easily identify additional customers, which may enable them to increase sales volume.

The details of processes and systems are set forth in the accompanying drawings and the description below. Other features and advantages will be apparent from the description and drawings, and from the claims.

BRIEF DESCRIPTION OF DRAWINGS

FIG. 1 illustrates examples of a buy side, a sell side and procurement private trade exchange (PTX) based applications.

FIG. 2 illustrates a high tech industries supply chain and levels of the chain where the RosettaNet RNTD might be used as a basis for a catalog taxonomy.

FIG. 3A illustrates a collaborative product taxonomy instantiation (CPTI) process.

FIG. 3B illustrates an example of an SAP PLM System collaborative folder as an environment for collaboration on a baseline taxonomy as described in FIG. 3A.

FIG. 4 illustrates an example of multiple buy-side systems, exchange applications and sell-side systems where an exchange part number (EPN) is mapped to multiple FFF equivalent BTF part numbers.

FIG. 5 illustrates an example of integrating CPTI into a broader set of functions as part of a cross application product taxonomy management (xPTM) system.

FIG. 6 illustrates the Cross Application Product Taxonomy Management (xPTM) process of FIG. 5 with a view of user roles.

FIG. 7 illustrates examples of RosettaNet Technical Dictionary (RNTD) version 1.4 classes, property sets, properties and property value expressions.

FIG. 8 illustrates a market exchange scenario with buyers, a marketplace and sellers using exchange part numbers (EPNs) as generated by a CPTI process.

FIG. 9 illustrates mapping of buyer part numbers and seller part numbers to EPNs resulting from a CPTI process in order to bridge the semantics disconnects that would otherwise result from buyers and sellers having different part numbers for parts which are FFF equivalents.

FIG. 10 illustrates CPTI catalog related terms, including a taxonomy, a taxonomy instantiation, a search engine and a part number associated with the taxonomy instantiation.

FIG. 11 illustrates a bill of materials (BOM) for a parent item (e.g., a computer) and an approved manufacturer's parts list (AMPL) for a component of the parent item.

Like reference symbols in the various drawings indicate like elements.

DETAILED DESCRIPTION

An industry-specific (high tech) example of Collaborative Product Taxonomy Instantiation (CPTI) is described herein. The principles of collaborative product taxonomy instantiation, however, are equally applicable to any manufacturing industry, such as automotive, aerospace, consumer goods, apparel, etc.

Taxonomies

A "taxonomy" is a set of classes, characteristics and values used to describe and catalog a plurality of objects (also called items, components, parts, products or materials). As used herein, "characteristics" in a taxonomy may also be called properties, attributes or specifications. The objects may be grouped into a "class" or "category." A taxonomy may also be called a "classification schema" or a "catalog search schema." A "product taxonomy" is a taxonomy used to categorize a set of products.

Several industry consortiums are developing taxonomies. For example, RosettaNet (see www.rosettanet.org) has developed an openly available, standard taxonomy (or classification schema) in response to the product numbering problem. RosettaNet's standard taxonomy is called the RosettaNet Technical Dictionary (RNTD). Computer and electronics companies may use the RNTD to describe and catalog electronic components, semiconductors, Information Technology (IT) equipment and other products.

FIG. 7 illustrates examples of RNTD classes 700, property sets 702, properties 704 and property value expressions 706. RNTD version 1.4 contains approximately 741 classes, 2,647 properties and 610 property sets. An example class is Memory-Dynamic RAM (DRAM), which includes seven property sets (e.g., "Semiconductor Package," "Semiconductor Common Set") and 105 properties, (e.g., "High Level Output Voltage"). RNTD property value expressions include a property domain (e.g., "integer" or "string") and property units (e.g., "volt" or "kilogram"), and others.

Standard taxonomies may serve two complementary purposes:
Provide a common meta-language in e-commerce for buyers and sellers to describe products and services in mutually comprehensible terminology; and
Use as search schemas in electronic catalogs (procurement or sales catalogs), which enable users to find product part numbers through selection or specification of product attributes.

As used herein, an "electronic catalog" ("e-catalog") is a computer-based catalog and does not refer to traditional paper catalogs.

An "exchange catalog" is a catalog accessible by computers of all enterprises within a trading community.

Electronic catalogs may already exist, typically at a seller's web site or behind the firewall as an internal catalog on the buy side. But a seller's catalog taxonomy and a buyer's catalog taxonomy currently may not be compatible (may not map category/attribute/value to category/attribute/value). The idea of using standard catalog schemas/taxonomies (to make it easier for buyers and sellers to precisely understand whether what is being sold is/is not the same as what is being bought) has not been widely implemented.

Taxonomies in a procurement private trading exchange (PTX) may provide a basis for:
Classification of internal part numbers (IPNs) and identification of part numbers that are FFF equivalent to other part numbers (resulting, for example, from mergers), which enables demand aggregation and excess inventory reduction;
Representation of common attributes of the IPN and the MPNs and/or VPNs in an AMPL.

Taxonomies in a sales PTX may provide a basis for creating a sales PTX catalog search schema.

Multiple Part Numbers on the Buy Side and Multiple Part Numbers on the Sell Side There are at least two e-commerce examples with multiple part numbers on the buy side 100 (FIG. 1): (a) a multi-division legal purchasing entity has multiple form, fit, function equivalent IPNs, which may be true of an enterprise operating a private procurement exchange 110, and (b) in the case of a public exchange, where multiple buy-side exchange participants collaborate in order to be able to aggregate demand.

A company operating a private procurement exchange (PTX) may have multiple FFF equivalent IPNs in their BOMs because:
The company's technology infrastructure may not be able to determine whether a required FFF equivalent IPN already exists before creation of a new IPN. For example, existing IPNs may not have all been categorized in a schema/taxonomy to enable a search to determine whether a required IPN exists.
Procedures to search and determine whether FFF equivalent IPNs exist before creating a new IPN may not be in place or may not be followed.
The company operating the PTX may have acquired other companies and still be using the acquired companies' legacy ERP systems.
The company operating the PTX might be a Contract Electronics Manufacturer (CEM) with multiple customers (OEDs that purchase contract manufacturing services from the CEM), where the customers (OEDs) have products containing FFF equivalent components with different part numbers. For example, two different computer OEDs may always have different IPNs for FFF equivalent parts since they may use different techniques or systems to generate part numbers for their IPNs.

There may be a key difference between the IPN/MPN relationship in B2B scenarios and in exchange-based scenarios. In B2B scenarios, there may be a one-to-many relationship between the IPN and various MPNs and VPNs (assuming no acquisitions, adequate procedures and technology). In public exchange-based scenarios, where there are multiple buy-side exchange participants, there is always a many-to-many relationship between buy side IPNs and sell side MPNs and VPNs.

Demand Aggregation

The multiple IPN scenario makes it difficult to aggregate demand to arrive at quantity for auctioning/bidding and RFQ/Quotation scenarios. For example, in FIG. 1, individual MRP planning runs to calculate net requirements in the back-end systems would result in separate planned requirements for the FFF-equivalent IPNs 1234, 4711 and 7890, such as:

1234=100
4711=100
7890=100

Seller Understanding of IPN

A related problem occurs in RFQ/Quotation scenarios: either in single (or multiple buying companies) to single (or multiple selling companies) B2B scenarios. A recipient 106 of the RFP/RFQ will by definition not understand the procurement entity's IPN. So even if demand for the multiple FFF equivalent IPNs were aggregated under a single part number (for example 300 units of IPN 4711), the seller 106 would not be able to respond the RFQ with a Quotation. The seller 106 will not understand the part number "4711."

Taxonomy Instantiations

The following excerpt from a RosettaNet document entitled "(PIP) Partner Interface Process 2A9/10 Query/Respond Technical Product Information," illustrates a taxonomy used as meta-language. The excerpt is an example of an e-commerce dialogue between a purchasing company (e.g., a buyer 104 in FIG. 1) and a group of distributors or sellers 106A-106C. The buyer seeks to identify possible sources of supply (i.e., distributors or sellers 106A-106C) for a DRAM computer component (represented in the RNTD as class XJA644 (Memory-Dynamic RAM)).

Query sent by Purchasing Company/OEM:
RosettaNet Class="XJA644"
Voltage="5"
Rated Maximum Power="GT 4 AND LT 6"
Pin Count="24"
Response sent by Distributor 1:
RosettaNet Class="XJA644"
Voltage="5"
Rated Maximum Power="GT 4 AND LT 6"
Operating Temperature="50"
Is Generic="1"
Pin Count="24"
Response sent by Distributor 2:
RosettaNet Class="XJA644"
Technology="CMOS"
Voltage [min]="1.1"
Voltage [max]="5.5"
Rated Maximum Power="GT 4 AND LT 6"
Operating Temperature [min]="45"
Is Generic="1"
Pin Count="20"

"E-Commerce documehts" may be in XML format and are transmitted via the Internet to a recipient. An "e-commerce dialogue" is an exchange of documents, for example as specified in a RosettaNet Partner Interface Process (PIP). For example, Buying company A sends an RFQ (Request for Quotation) document with specifications for a product to Selling Company Z. Selling Company Z may respond with a Quotation document for a specific product. Buying company A may respond with a Purchase Order document for the specific product. Selling company Z may respond with an Order Confirmation document for the specified product. Selling company Z may send an Advanced Shipment Notification (ASN) document for the specified product.

The dialogue above illustrates the use of RNTD taxonomy "instantiations" to define what is needed by a buyer and what is available from sellers. A "taxonomy instantiation" includes a set of properties (or attributes or characteristics) selected from a class (or category) in a base taxonomy, e.g., RNTD, and values selected or specified for the attributes. For example, the attributes/properties above were selected from seven property sets and 105 properties associated with the DRAM class in RNTD. This use of the RNTD as a commonly understood meta-language enables the members of the trading community to engage in a commerce dialogue. But this dialogue is not yet an automated dialogue.

Human involvement may be necessary in an e-commerce document exchange when the receiving system cannot automatically process the incoming document. This could be for several reasons. For example, the document may contain a part number not recognized by the recipient's system (because a material master had not been previously created). Alternatively, the document could be in the wrong format, i.e., the incoming document contained a taxonomy instantiation that is not machine sensible by the recipient's system because of one of several reasons. Most likely, the recipients system may not have transactions like "Import taxonomy instantiation" and "Search via classification (a.k.a. taxonomy)." Another reason is the recipient may not have categorized parts into the taxonomy. Another reason is the sender and the recipient might have used different taxonomies.

If the buyer organization 104 (FIG. 1) had used its internal part number (IPN) "4711" to represent DRAM without additional information or dialogue, the sellers 106A-106C would not have been able to respond. In most cases, the part number alone does not convey the required information, and would therefore require additional dialogue.

A buying organization 104 may not know the selling organization's MPN for the buyer's FFF equivalent IPN. If both commerce partners use the same standard schema/taxonomy, the buyer 104 may provide the seller 106 with a set of attribute values as a means of specifying what the buyer 104 would like to purchase.

The example above describes a dialogue where a single buying company corresponds with multiple distributors to determine whether the distributors have an available electronic component that is form, fit, function (FFF) equivalent to what is required by the buyer. The dialogue includes only seven of the 105 properties included in the class for DRAM class XJA644. Rarely would a buyer need to specify values for all 105 of the properties for DRAM to describe a DRAM to a degree of specificity required by the buyer to determine that the manufacturers offering might be FFF equivalent.

The PIP dialogue example above does not actually describe a collaborative taxonomy instantiation process (described below) but rather an exchange of information initiated by a buyer to identify sources of supply, probably to populate an AMPL.

A key difference between the PIP dialogue above and the collaborative taxonomy instantiation process described below is that the PIP dialogue does not result in a collaborative taxonomy instantiation. The collaborative taxonomy instantiation process (below) precedes the actual buy/sell process. The collaborative taxonomy instantiation process (below) enables the buy-sell process to function in a much more automated way since an exchange part number (EPN) is linked to a collaborative attribute/value set, based on a standard taxonomy, which represents an agreed upon degree of specificity to represent FFF equivalency.

In one configuration, the collaboration process may also occur via a web-accessible PLM Collaborative Folder (FIGS. 3B and 5), where a segment of the RNTD in the spreadsheet format (also available at rosettanet.org) is accessed and collaboratively modified by trading partners. The trading partners highlight the most relevant properties of a product taxonomy, and optionally specify additional properties, then specify values for the properties. In another configuration, the trading partners may access a web-accessible catalog maintenance environment, where the baseline taxonomy has been imported and the created as a catalog search schema.

Shortcomings of Standard Taxonomies

While standard taxonomies, such as the RNTD taxonomy-based approach specified by RosettaNet PIP2A9/10, may provide a basis for addressing the different part numbering problems in a supply chain, they may not solve the problem.

Reasons for the problem include the following:

Taxonomy instantiations are not generally "machine sensible" by computers.

So if the buyer's e-procurement system is able to transmit a taxonomy instantiation (at least as free form text contained in a field within a Request for Quotation (RFQ) e-commerce document), the sellers' e-selling system would not be able to automatically process the RFQ e-commerce document for a product represented using this technique. Nor could the buyer's e-procurement system automatically process quotation documents from the seller's system containing taxonomy instantiations like the examples shown above.

One exception in a "mySAP" Sales and Distribution (SD) module of SAP's R/3 ERP system, which may be able to import and process a sales configuration instantiation received from an SAP Customer Relationship Management (CRM)/Internet Pricing Configurator (IPC)'s Sales Configuration Engine (SCE). SAP's R/3 Sales and Distribution module includes sales order entry and management, including pricing, tax calculation, availability checking, and triggering of accounts receivable. SAP R/3's SD component can receive a taxonomy instantiation from another SAP component, the Sales Configuration Engine (SCE).

But this system is not operative in the e-commerce environment of CPTI, because the SAP components SD and SCE are homogeneous systems, not heterogeneous. Both SD and SCE components can process the same so-called product configuration Knowledge Base (KB), which comes from the same maintenance environment (e.g., PIN). This is not true in a trading community environment where the participants likely have heterogeneous software and/or computer systems.

Even if a trading partner's system could automatically send (most can, at least as text) taxonomy instantiations, and even if a recipients' system could automatically process taxonomy instantiations (most systems cannot initiate an electronic catalog search to find a product corresponding to the FFF expressed in the taxonomy instantiation), it would still be necessary for the commerce partners to have cataloged their products using the same taxonomy as the transmitted taxonomy instantiation (e.g., an instantiation based on the RNTD). Realistically, many enterprises have not done this massive cataloging project, or at least have not cataloged a critical mass of their products for the same release version of the same taxonomy at the same time. This is because:

Taxonomies evolve. For example, the RNTD is at version 2.0 and still evolving. Even when the buyers and sellers use a standard taxonomy, like RNTD, there is the issue of multiple versions. The current version 2.0 differs substantially from its predecessors, e.g., version 1.4.

Taxonomies can be very deep and very broad. For example, the RNTD version 1.4 has approximately 741 classes, 2,647 properties, 610 property sets and an unlimited number of property values. It may be prohibitively expensive for a manufacturer with a large product range to catalog all of its products at all levels of detail of the taxonomy.

The RosettaNet PIP 2A9/10 approach of exchanging taxonomy instantiations, rather than part numbers, may not be useable by all e-commerce and enterprise systems. Even if the receiving system is capable of automatically receiving and processing a taxonomy instantiation (i.e., populate attribute value sets in transactions like "Import taxonomy instantiation" and "Search via Classification"), it would still be necessary for part numbers in the receiving system to have been previously categorized into the taxonomy, so that the "Search via Classification" transaction would yield a result.

To use a taxonomy and assign a part number, for example in SAP's R/3 Enterprise system, there is a view of a material master (used to represent a product, or part number, or part identifier in the BTF enterprise system) called the Classification View. First, the taxonomy should be replicated in the ERP system. In R/3, this may be done via a series of transactions:

Create characteristics (e.g., "Resistance Value") and values (e.g., "2200 Ohms, 1100 Ohms")

Create class (e.g., DRAM)

Link the characteristic Resistance Value to the class DRAM (the characteristic values are linked automatically since the values are previously linked to the characteristic)

Create the classification view of a material master.

In a transaction called "Maintain Material Classification," a view in the material master, a user classifies a material=DRAM="4711" into the class/attribute/value set for the "DRAM" class. The user specifies the name of the class, e.g., "DRAM." Upon entry of the class name into the transaction, the system displays all of the characteristics and values for the class. For example, the characteristic "Resistance Value" and the values "2200 Ohms, 1100 Ohms." If DRAM "4711" uses 2200 Ohms, then the user selects the characteristic value "2200 Ohms" (as well as all other relevant characteristics and values for the material 4711). The user then "saves" this class instantiation, which is linked to the material.

The saved class instantiation enables the user to find the material/part number for DRAM 4711. The user enters the class "DRAM" in the transaction "Search via Classification," or selects from a drop-down list. The system automatically displays all characteristics and values linked to the class (in this case, the characteristic Resistance Value and the values 2200 Ohms, 1100 Ohms. If the user wants to find the part number for a DRAM component requiring 2200 Ohms, the user clicks on the characteristic value "2200 Ohms," which prompts the system to list the part number for the 2200 Ohm DRAM component, which in this example is 4711.

The example above only discusses linking characteristics and values to the class "DRAM" which is linked to the material component "4711." The example describes the set-up required to find a material (e.g., DRAM component 4711) via its characteristics, using a catalog search engine or an internal classification system, like the one that exists in SAP's R/3.

The example above is a description of a simple catalog taxonomy. In direct materials procurement, it may be necessary for a procured item to be FFF equivalent to what is needed by the buyer, and the taxonomy may be much more complex. For example, the RNTD version 1.4 DRAM class has 105 properties. Each property can have a very wide range of allowable values. Thus, a buying entity's process of categorizing all of its parts into a taxonomy, like the RNTD, may be a massive project with massive costs, especially when considering parts databases of tens or hundreds of thousands of parts.

While some companies may recognize the benefit of using taxonomies, they may also recognize that the benefit can only be realized if the buying companies' sell-side trading partners have also categorized all of their parts into the same schema. Generally, industries may recognize the value of using taxonomies, but have not done it yet because it is a very expensive process. The ROI potential of this process may not be significant until a critical mass of companies within an industry have categorized their parts. As of today, only a very small percent of companies may have made the investment.

Even in high tech, which is generally recognized as being much more advanced in the standards arena than other industries, companies may wait before adopting taxonomy standards because the standards are still evolving. For example, RNTD has already been revised several times. If a buying company categorized all parts based on RNTD 1.4, and a selling company categorized based on RNTD 2.0, a schema/taxonomy instantiated and generated by the buying company may not be automatically processed by the selling company. Even if the selling company's system had the necessary "Search via classification" transaction or used an electronic catalog, the selling company cannot automatically process the taxonomy instantiation because each of the two revisions could have characteristics and/or values that the other did not.

The supply-chain disconnect caused by different part number semantics may require phone calls and e-mails in order for buyers and sellers to determine the Form, Fit, Function specifications. These actions fail to take advantage of the potential ROI of e-selling and e-procurement systems in all environments, including public and private procurement and sales exchanges, as well as electronic auctioning and bidding systems.

Even if buyers and sellers agree to use a standard taxonomy, and even when their respective e-selling and e-procurement systems can send and receive taxonomy instantiations (class, property, value combinations), typically these systems require a part number to trigger the applications. This means that a recipient of an RFQ based on a taxonomy instantiation, for example, would still be required to "manually" examine the taxonomy instantiation, and then search with tools to see if a part number exists in the seller's parts database with the FFF described in the taxonomy instantiation sent by the buyer. This is because the seller's system likely would not be able to automatically trigger a taxonomy based search for a part number corresponding to the form, fit, function described in the taxonomy instantiation.

This manual search step breaks the efficiency of the automated e-commerce dialogue, even in the best case, where the seller uses the same taxonomy as the buyer—as the RosettaNet industry consortium envisions with the RNTD.

Buy- and sell-side e-commerce systems can automatically process part numbers, if the part numbers have been created as master data within the e-commerce systems. However, where buying or selling entities receive an e-commerce document containing a part number where the part number has not previously been defined as master data, the document recipient's system will not be able to automatically process the document.

The Internet offers the prospect of either buyers or sellers being able to more easily contact a larger number of prospective customers or vendors. But the problem of buyers and sellers not being able to automatically process e-commerce documents where the trading partners' part numbers are not known compounds with each additional potential trading partner.

Therefore buyers and sellers require an efficient way to determine FFF equivalency without extraneous dialogue between buyers and sellers.

There are two related techniques to represent FFF equivalency: representation as a taxonomy/schema instantiation and representation as a part number derived from or linked to a taxonomy/schema instantiation.

The first technique involves representing the commerce object (e.g., an electronic component) as a taxonomy/schema instantiation. For example, the following may be a taxonomy instantiation in an XML document format:

<Resistance Value>220 Ohms</Resistance Value>
<CircuitDesignator>IndependentCircuit</Circuit Designator>
<TR Tolerance>+/− 5% and TCR +/− 100 PPM/C</TR Tolerance>
<Packaging Type>Tube </Packaging Type>
<Number of Terminals>16</Number of Terminals>
<Package Style>QSOP</Package Style>
<Product Class>Thin Film on Silicon</Product Class>

A problem with this technique is that generally very few e-commerce systems can automatically process documents containing schema instantiations, although many e-commerce systems can process documents containing part numbers, if the part number has previously been defined as master data.

Information needed by e-selling and e-procurement applications is typically linked to a part number. The R/3 part number length may be 18 characters in length. Other systems may support longer part numbers. Only very few (if any) e-commerce systems would be able to support product representations as long as a schema instantiation for a technical product.

A heterogeneous systems environment is a trading exchange environment where the buy-side and sell-side participants use a variety of packaged software and/or in-house developed systems. In such environments, there are no scenarios where the participant's e-commerce and back office systems would generally all be able to process schema/taxonomy instantiations in the way that they are able to process part numbers today. On the other hand, many business application systems use the technique of linking part numbers to additional information that is meaningful to a system, e.g., e-selling, e-procurement, supply chain management, Enterprise Resource Planning (ERP) systems.

This leads to the possibility of using a technique where FFF equivalency can be modeled as a part number: either as a part number derived from a schema instantiation, or as a sequentially-generated, internally assigned number linked to a schema instantiation. For example, the sequentially generated, internally assigned number may be generated by R/3 PLM and then linked to a schema instantiation using Stockable Type or Product Type creation capability with PLM under R/3's Variant Configuration capability.

Collaborative Product Taxonomy Instantiation (CPTI)

CPTI is a collaborative solution that resolves disconnects related to different product part numbers and removes constraints to e-commerce within trading communities. CPTI incorporates standard taxonomy concepts and addresses the above-mentioned problems. To address the above-mentioned problems, the CPTI process may include enhancing and customizing a baseline standard taxonomy; creating an instantiation (specifying attributes and attribute values); and assigning an exchange part number (EPN) to represent the instantiation in e-commerce documents.

FIG. 3A illustrates a collaborative product taxonomy instantiation (CPTI) process.

I. In a block 330 of FIG. 3A, the CPTI process, includes a pre-commerce process of one or more buyer(s) and seller(s) agreeing on a baseline taxonomy and creating a collaborative taxonomy instantiation by adding, changing and/or deleting form, fit and function characteristics and values. Thus, the buyer(s) and seller (s) agree upon a level of form, fit and function) equivalency.

A "collaborative product taxonomy instantiation" is a collaborative creation of a taxonomy instantiation based on an agreed upon taxonomy where the trading community members agree that the instantiation represents a level of Form, Fit, Functional equivalence.

II. In a block 332, the entity operating the exchange (e.g., buying enterprise) designates an exchange part number (EPN) to represent the collaborative taxonomy (C-Tax) instantiation. The EPN may comprise a set of any number of alphanumeric characters or symbols. The CPTI EPN corresponds to an instantiation of a class. Thus, an exchange part number (EPN) is a part number linked to a collaborative taxonomy instantiation agreed to by trading community participants. It will be appreciated that, depending on the nature of the taxonomy being used, there may be various degrees of sub-classification. Thus, a taxonomy could include sub-classes, where the instantiations fall under a sub-class.

Buyers and sellers may use the EPN in e-commerce documents within a trading community to represent products they are buying and selling.

CPTIs and EPNs may enable OEMs 208, OEDs and CEMs 220 (FIG. 2) to easily collaborate with component manufacturers 216 and distributors 206, 204 to quickly determine FFF equivalency. This may enable procuring entities to purchase electronic components and for sellers to more easily directly sell electronic components.

CPTI may enable CEMs 220 to rationalize multiple AMPLs and benefit from interchangeability of procured components when manufacturing products for the CEMs' multiple customers.

A "collaborative taxonomy" is a catalog taxonomy created together by members of a trading community, usually starting with a base standard taxonomy (e.g., RosettaNet's RNTD, UNSPSC, eClass, BMEcat, etc.), and then deleting and/or adding classes, characteristics and values.

In contrast, the RosettaNet Technical Dictionary (RNTD) is an uninstantiated taxonomy, comprised of Classes, Property Sets, Properties, and Property Value Expressions. The RNTD has class IDs, where DRAM is a "class." A virtually infinite number of instantiations could be generated from an RNTD class taxonomy. Manufacturers and distributors offer hundreds of variations of DRAM products, each with their own part number. Through categorization into the RNTD taxonomy, each DRAM product may generate separate instantiations, none of which might be FFF equivalent.

III. In a block 334, an exchange operator may subsequently catalog (or categorize) EPNs, related taxonomies and instantiations into a trading exchange-based, web accessible, electronic catalog (e-catalog).

FIG. 10 illustrates an electronic catalog 1010, which includes a taxonomy 1000, at least one taxonomy instantiation 1002, a search engine 1004 and at least one part number 1006 associated with the taxonomy instantiation 1002.

The "catalog taxonomy" is the catalog's complete set of classes (a.k.a. categories) 1012, characteristics (a.k.a. attributes or properties) 1014, value ranges 1016 and values 1018.

The "catalog search engine" 1004 is a software component that may (a) search the catalog's taxonomy (a.k.a. "search schema") 1000 to find parts, prompted by user selection or specification of class 1012, characteristics 1014 and values 1018, and/or (b) find and display taxonomy instantiations 1002 as prompted by user selection or entry of part numbers 1006.

Members of the trading exchange community may access the search engine 1004 and enter sets of characteristics and values for products that buyers would like to buy or sellers would like to sell. The search engine 1004 may find any EPNs that already exist for the characteristics and values.

Putting the taxonomy instantiation 1002, and the instantiation's EPN 1006, into an exchange catalog 1010 enables a seller/recipient of an e-commerce document (e.g., an RFQ containing an EPN) to access the catalog 1010 and display the taxonomy instantiation 1002 that correspond to the EPN 1006. Displaying the taxonomy instantiation 1002, which corresponds to an EPN 1006 appearing in an RFQ, may enable the seller in a buy-side hosted exchange to determine whether it has an FFF equivalent product upon which to base its response to the RFQ. A buyer in a sell-side hosted exchange can use the taxonomy instantiation 1002 as a basis to determine whether it has an IPN whose requirements may be fulfilled by a distributor or vendor who offers VPNs or MPNs with the same instantiation as the EPN.

The resulting taxonomy instantiation 1002 used in the exchange catalog 1010 may be expanded or modified as a result of each CPTI session. The taxonomy 1000 may be different than a taxonomy used in either the buy-side participants' behind-the-firewall catalog (if they have one) or the sell-side participants' catalog (if they have one). However, the resulting product taxonomy instantiation and exchange part number may be incorporated into the buy- and sell-side participants' BTF catalogs.

There may be several reasons for (I) the pre-commerce process of collaboration on the base taxonomy and (II) designation of an exchange part number (EPN) to represent the collaborative taxonomy instantiation.

Collaboration may reduce or expand or edit the classes and properties of the standard taxonomy. Version 1.4 of the RNTD contains approximately 741 classes, 2647 properties and 610 property sets. The class for DRAM includes seven property sets, and 105 properties. It may be unlikely that the range of products traded in any Private Trading Exchange (PTX) 110 (FIG. 1) would span all classes of the RNTD. For any given class, it may be unlikely that all properties of all property sets would be required to specify a given product in the PTX. It may also be likely that a given traded item might require a new class or additional properties than those available in the taxonomy before the collaboration process, which would result in the addition of a class and properties to the baseline taxonomy.

So one of the first acts in preparing for PTX e-commerce sessions may be for the trading community to collaborate on the scope of the exchange's taxonomy, based on, for example, the RNTD. Since a given PTX would likely only trade some subset of the total baseline taxonomy product array, the collaborative taxonomy may only include instantiations of certain properties within a baseline taxonomy class. The instantiations derived from the extracts represent products that are planned to be traded in the PTX.

Collaboration may expand the standard taxonomy. Buyers may want to define requirements using properties not in the baseline standard taxonomy version. Sellers may want to highlight differentiating features not reflected in the current standard. Standard taxonomies may become obsolete. Any given taxonomy may evolve. For example, the current RNTD version (2.0) is the fifth version of the dictionary. A standard taxonomy might benefit from refinement or expansion, especially between standard schema version releases.

RosettaNet has defined the RNTD as an industry standard taxonomy. But very few, if any, companies have precategorized their parts into the taxonomy to the degree necessary to determine FFF equivalence. Also, taxonomy standards will always lag the evolving technology. Selling entities in particular may feel that the standard taxonomy is not up-to-date or robust enough to accurately and completely describe what the selling entities wish to sell. However, using a standard taxonomy, like RNTD, as a baseline for collaboration in a CPTI process, would be much more productive than creating a taxonomy starting with nothing. While it requires upfront work for buyers and sellers to create a collaborative taxonomy to determine whether what a seller offers is FFF equivalent to what a buyer wants to buy via reference to collaborative taxonomy instantiation, the process may be much more efficient if the trading partners start with a baseline taxonomy, if one exists. It is reasonable to assume that the baseline RNTD for a given class, like DRAM, might be 85 to 90% as specific as it would need to be. Forming collaborative taxonomy instantiations may require up-front work by at least some of the exchange participants as a prerequisite to automated e-commerce. However, once taxonomies and associated EPNs have been established via CPTI, the problems resulting from different part numbers are solved, and buyers and sellers will no longer be constrained from engaging in fully automated e-commerce processes in the buying and selling of direct- and stockable MRO materials.

A proprietary taxonomy may be used as a competitive advantage. Enterprises or consortiums may prefer a proprietary taxonomy to enable product differentiation or to reflect newly developed technology. The enterprises and consortiums may accordingly regard the collaborative PTX taxonomy to be a source of competitive advantage. The proprietary taxonomy might be based on, or be an extension or refinement of, a standard taxonomy.

EPNs represent collaborative taxonomy instantiations. Pre-commerce collaboration enables participating companies to enter the resulting EPNs into their e-selling and e-procurement systems as material or part "master data." The e-selling and e-procurement systems may generate and automatically process e-commerce documents, e.g., RFQs and Quotations, which contain EPNs, if the EPNs have been entered as master data in the participating companies systems. Unless EPNs are entered as master data in the trading partners systems, EPNs in incoming e-commerce documents may not be processable electronically by the receiving e-procurement and e-selling systems.

"Master data" describes data (e.g., parts, vendors, customers, prices, costs, etc.) that is predefined in e-commerce and back office systems. The predefined master data enables the systems to process transactions (e.g., entering sales orders or purchase orders) that contain part numbers. For example, if the part number 4711 has been defined in an e-selling system, and sales related master data for the material has been maintained, then the e-selling system could automatically fill in the price on a sales order after entry of the part number as a line item in the sales order. As another example, if inventory management related master data for the part has been maintained in the system, then the system could automatically calculate the availability date of the item based on information generated by applications (e.g., MRP or SCM) which use the inventory management related master data.

The availability of a standard taxonomy, like the RNTD, may provide a jump-start in developing a collaborative taxonomy, which can be modeled as a variant of a standard taxonomy.

FIG. 3B illustrates an example of using an SAP PLM System collaborative folder as an environment for the collaborative product taxonomy instantiation process as described in FIG. 3A between a buyer or procurement side 300 and one or more sellers 312. FIGS. 3A-3B are described below with FIGS. 4-6.

Collaborative Product Taxonomy Instantiation (CPTI) (FIG. 3A) may represent a collaborative aspect of a broader process called Cross Application Product Taxonomy Management (xPTM). (FIG. 5).

FIG. 5 illustrates an example of integrating a CPTI process (white boxes) into a broader set of functions called Cross Application Product Taxonomy Management (xPTM) (i.e., xPTM includes an environment to manage the process of linking the EPN and the collaborative taxonomy into buy-side 502, sell-side 504 and private trading exchange (PTX) applications. FIG. 5 shows CPTI and xPTM from the perspective of a procurement private trading exchange (PTX), where the EPN and the collaborative taxonomy are integrated with applications or components in buyers' and sellers' enterprise computer systems 502, 504. xPTM and CPTI may also be applicable in a Consortia Trading Exchange (CTX) and/or a sales private trading exchange (PTX). Stated generally, the present invention includes linking the collaborative taxonomy to back-end systems that integrate with the data or information communicated. More specifically, in xPTM, the CPTI is used to integrate the IPN (Internal Part Number) and the MPNs (Manufacturers Part Numbers), and/or VPNs (Vendors Part Numbers) that are FFF equivalent of the IPN, into the AMPL (Approved Manufacturers Parts List). The AMPL is, in turn, integrated into the following enterprise system product objects:

The BTF (Behind the Firewall) catalog, used by internal design and procurement engineers to search, find and use existing IPNs and associated AMPLs in new BOMs (Bills of Materials), where the new BOM requires a component with the same FFF as an existing IPN.

Configurable product BOMs (Bills of Materials) where the AMPL's MPNs are modeled as procurement variants in order to enable simulation in BW (Business Information Warehouse) of the effect of selecting alternative MPNs within the AMPL in terms of resulting cost and lead time of the configurable equipment, whose BOM contains the AMPL.

FIG. 5 illustrates integrating the EPN and the collaborative taxonomy into buy-side, sell-side and private trading exchange (PTX) applications.

The buy side 502 in FIG. 5 may include several software modules, such as an R/3 Materials Management (MM) module 506, Business Information Warehouse (BW) module 508, Supply Chain Management (SCM) module 510, BTF catalog management/search engine module 512, Supplier Relationship Management (SRM) module 514, Product Lifecycle Management (PLM) module 516, and another OTF catalog management/search engine module 518. These modules 506-522 may be available from SAP.

SAP R/3 is software supporting enterprise resource planning (ERP). SAP R/3 and the other modules are described at www.sap.com.

The catalog management part of the OTF catalog management/search engine 518 may be an environment to collaboratively create a catalog product taxonomy, instantiate the taxonomy, and then categorize the resulting EPN into the catalog taxonomy. The catalog search engine is software that enables a user to find a part by specifying its characteristics or to display the characteristics of a specified part.

The PLM application 516 may be an environment to create product-related master data in an Enterprise Resource Planning (ERP) system. The PLM 516 may also provide an environment to collaboratively specify a collaborative taxonomy, taxonomy instantiations, and for generation of EPNs.

In FIG. 5, the CPTI process may include a start function 544, a download taxonomy to collaborative-folder function 546, a collaborate on taxonomy function 548, a collaborative taxonomy (c-tax) file and folder 550, which holds the taxonomy, a create EPN for c-tax function 552, a catalog EPNs to c-tax function 554 and a resulting catalog of EPNs 556. All other functions shown in FIG. 5 may be Cross Application Product Taxonomy Management (xPTM) pr enterprise system or e-selling or e-procurement functions. The PLM 516 c-Folder components and exchange-based catalog management/search engine 518 may be accessible outside the firewall (OTF) of the buy side enterprise system, on the exchange.

FIG. 6 illustrates the Cross Application Product Taxonomy Management (xPTM) process of FIG. 5 with a view of user roles. The following scenario describes CPTI used in a procurement Private Trading Exchange (PTX), where the buying company 300 may seek additional sources of supply for a strategic component (e.g., DRAM).

In a block 546 in FIG. 5 (block 616 in FIG. 6), a buy-side procurement engineer 302 (FIG. 3B) secures or downloads a taxonomy to be used as a baseline taxonomy for collaboration. For example, the spreadsheet version of the RosettaNet RNTD, version 1.4, may be downloadable from www.rosettanet.org. The buy-side procurement engineer 302 specifies relevant DRAM attributes among attributes provided by the baseline taxonomy 304 and specifies values for the specified attributes.

In a block 548, the buy-side 502 and the sell-side 504 collaborate on a taxonomy. In blocks 604, 606 and 616 of FIG. 6, the design engineer and procurement engineer may specify a schema attribute range and collaborate 620 with a sell side 602 product manager on a taxonomy instantiation. The buy-side procurement engineer 302 (FIG. 3B) publishes the baseline taxonomy with specified relevant DRAM attributes 308 on the web 311 via secure communication 307 with eXtensible Markup Language (XML) or xCBL. xCBL is an XML variant. XML is a technique to format a document in a way that it can be read if processed by a computer. There are many XML variants.

In one configuration, the engineer 302 may use an SAP Product Lifecycle Management (PLM) collaborative folder (c_folder) 306, which is currently available from SAP, or a web-enabled collaborative catalog maintenance environment. The PLM collaborative folder 306 is a web accessible folder where documents can be stored, accessed and modified by trading partners. The folder 306 may be used for collaborative configuration and classification schemas. Storing the published baseline taxonomy with specified relevant DRAM attributes 308 in a c-folder 306 enables sellers 312 to access and process (expand, reduce) the baseline taxonomy.

One or more sellers 312 may specify attributes of their DRAM product offerings in the collaborative taxonomy 304. The sellers 312 may want to specify attributes not originally included in the baseline taxonomy. A seller may have developed a product feature not yet in existence when the baseline taxonomy was created. The seller 312 adds the attribute representing the product feature to the buyer-specified collaborative taxonomy stored in the c-folder 306 which the procurement engineer 302 can also access.

In blocks 606, 618, 620 of FIG. 6 (and block 548 in FIG. 5), a buy-side design engineer and/or the procurement engineer 302 and a sell-side product manager collaborate on taxonomy characteristics and values.

After collaboration, the procurement engineer 302 evaluates the sellers' specified attributes, rationalizes these with the buyer provided attributes and specifies a resulting collaborative taxonomy (c-tax) instantiation 550. In a procurement exchange, the procurement engineer 302 may finalize the collaborative taxonomy instantiation, which may include additions or changes to the buyer-published initial collaborative taxonomy as provided by one or more sellers 312. The procurement engineer 302 may decide to manage revisions to the collaborative taxonomy instantiation by creating corresponding versions or revision levels with PLM. In a sales market exchange, the process may be the same except that the initial instantiation and collaborative taxonomy instantiation finalization and revision is performed by the seller, with buyers proposing modifications. In a public market exchange FIG. 8 the marketplace 802 administrator may provide the initial instantiation and collaborative taxonomy instantiation finalization and revision, with both buyers 800 and sellers 804 proposing modifications. Using the DRAM RNTD example above, an example of a collaborative taxonomy instantiation may be derived:

RosettaNet Class="XJA644" (DRAM)
Technology="CMOS"
Voltage [min] "1.1"
Voltage [max]="5.5"
Rated Maximum Power="GT 4 AND LT 6"
Operating Temperature [min]="45"
Operating Temperature [max]="50"
Is Generic="1"
Pin Count [min]="20"
Pin Count [max]="24"

In a block 524 (FIG. 5) (block 608 in FIG. 6), a design engineer on the buy side 502 may create one or more Internal Part Numbers (IPNs) or IPN material masters.

In a block 534 (block 610), the design engineer may catalog IPNs to the collaborative taxonomy (c-tax) instantiation, i.e., link an IPN to the class, attributes and values of the c-tax.

In a block 612, the design engineer optionally uses Product Lifecycle Management (PLM) to create a version or revision level of the c-tax document 550.

In a block 536 (block 614), the design engineer specifies category attribute values of the IPNs and uses the c-Tax and IPNs to create an Approved Manufacturers Parts List (AMPL) structure.

In a block 564 (block 622), the sell-side product manager catalogs MPNs or VPNs to the c-Tax instantiation.

In a block 552, the design engineer or procurement engineer 302 generates, designates or specifies an exchange part number (EPN), e.g., "4711," to represent the collaborative taxonomy instantiation. Thus, an exchange part number (EPN) is correlated with a collaborative taxonomy instantiation. The part number may be a sequentially assigned number or may be a part number designed to be recognizable as correlating to the instantiation (sometimes know as an "intelligent" part number). The procurement engineer 302 may catalog an IPN as an EPN or generate a separate EPN.

In a block 554, the procurement engineer 302 catalogs the EPN into an exchange catalog 1010 (FIG. 10) to produce a catalog 556 of EPNs 1006. An exchange catalog search engine 1004 may use the collaborative taxonomy 1002 as the catalog search schema/taxonomy. The exchange catalog search engine 1004 allows users to specify or select attribute values from the C-tax 1000, which triggers the search engine 1004 to retrieve and display EPNs that have the specified attributes.

The collaborative taxonomy 1002 enables trading partners 302, 312 to find EPNs where the desired form, fit, function (FFF) is known, but the corresponding EPN is not. For example, if a trading partner 312 wants to promote a product for sale or generate a sales quotation in response to an RFQ, but does not know whether collaboration has already occurred or whether a useable EPN already exists, the sell side trading partner would like to find out the attributes and values of an EPN. In another example, a seller may want to know whether there is a part in the catalog 1010 where the part is a DRAM component, with CMOS technology, with minimum voltage or 1.1, etc. The catalog search engine 1004 would find the part based on the user specification or selection of these attributes in the catalog.

The collaborative taxonomy 1002 enables trading partners 302, 312 to find the taxonomy instantiation where the EPN is known but the associated form, fit and function (FFF) are not. For example, if a supplier received an RFP/RFQ for "4711," and wants to determine the associated FFF, the supplier can enter the EPN 4711 into the catalog search engine prompting the catalog to display the attributes and values of 4711. If the EPN had already been cataloged into the supplier's BTF catalog, the supplier would know the EPN and taxonomy instantiation. However, the supplier might not know the EPN in a scenario, for example, where the supplier is a new member of the trading community and was not able to participate in the original collaboration process.

FIG. 4 illustrates an example of multiple buy-side systems 402 and sell-side systems 406 that map an exchange part number (EPN 4711) to FFF equivalent BTF part numbers. In FIG. 4, buyers 408A-408C and sellers 418A-418C may integrate the EPN into their respective enterprise computer systems by mapping the EPNs to their respective FFF equivalent IPNs, MPNs and VPNs.

In FIG. 4, the EPN 4711 has been mapped to the Internal Part Numbers (IPNs) 1234 and 7890 on the buy side 402 and to the MPNs ABCD and EFGH and the VPN WXYZ on the sell side 406. This mapping enables the respective enterprise systems on the buy and sell sides 402, 406 to automatically translate to and from their respective IPNs, during generation of purchasing documents, and MPNs and VPNs, during generation of sales documents. FIG. 4 also illustrates use of the EPN 4711 by the exchange-based systems 412, for example, for demand aggregation 414A, generation of Request for Quotations (RFQs) 414B, and auctioning/bidding 414C.

Once the collaborative taxonomy 1000, the collaborative taxonomy instantiation 1002 and associated EPN 1006 have been established, operators of a procurement PTX may use (a) the collaborative taxonomy 1000 as a search schema in the catalog 1010 to search for part numbers with FFF specified by the taxonomy instantiation; (b) the EPN 1006 in RFQs to communicate to sellers the FFF requirements of the products to be procured (the recipients can enter the EPN 1006 in the exchange catalog 1010 to display the EPN's taxonomy instantiation 1002); (c) and the EPN 1006 in the exchange auctioning and bidding system, DA/DB; (d) the taxonomy instantiation 1002 in an AMPL, in order to specify the FFF parameters by which the IPN, MPNs and VPNs within the AMPL are grouped.

The technique of CPTI and the resulting EPNs may be used to enable automated translation from several different IPNs on the buy (demand) side into a single, common EPN, which can be used by multiple PTX applications, such as demand aggregation 414A (FIG. 4), auctioning and bidding 414C, the generation and transmission of RFQs 414B, and the translation of EPNs in RFQs received by multiple sell side systems into MPNs and VPNs within the sellers' systems.

On the procurement side 402, 502, a buyer 408 may model the EPN as a manufacturer's part number (MPN), which is linked to a buyer's internal part number (IPN) via an approved manufacturers parts list (AMPL) 410A or a purchasing information record 410C. As a result, purchasing documents generated by the buyers 408A-408C may contain both the IPN and the EPN. The EPN is recognizable by the sellers' systems if the seller's system (which may have participated in CPTI) can search the EPN in an exchange catalog or the seller's system has modeled the EPN as a Customer Part Number (CPN). Additionally, the sell-side systems generally may be able to automatically translate the EPN, modeled as a CPN, into the sellers' FFF equivalent MPN or VPN In a block 540 (block 628), the procurement engineer on the buy-side 502 may enter an EPN into an auctioning and bidding application 414C (FIG. 4).

An Approved Vendors List (AVL) can refer to the same function as defined above for AMPL.

On the sales side 406, 504, in a block 558 (block 624), the sales engineer or product manager either (a) engages in a CPTI process, and takes the resulting EPN, or (b) selects EPNs of interest resulting from earlier CPTI sessions from the exchange opportunity catalog 556, and enters/maps/models an EPN as a customer part number (CPN). The CPN may be linked to a seller's MPN or VPN. Boxes 416A-416C in FIG. 4 show EPNs modeled as CPNs. The EPN-modeled-as-CPN may automatically translate into a seller's Internal Part Number (IPN). The IPN may be a MPN, if the seller is a manufacturer 418A or 418B. The IPN may be a Vendor Part Number (VPN), if the seller is a distributor 418C. The EPN-modeled-as-CPN enables the recipient's e-selling or enterprise system to automatically translate an EPN received in an RFQ into the seller's MPN or VPN. In a block 560 (block 626), the seller may respond to auctioning and bidding system generated RFPs and RFQs.

In a block 538 (block 628), the procurement engineer may enter the EPN or MPNs or VPNs selected as a result of an auctioning and bidding process into an AMPL or AVL for the buyer's IPN.

FIG. 8 illustrates a market exchange scenario with buyers 800, a marketplace 802 and sellers 804 that use exchange part numbers (EPNs). In blocks 806 and 830, buyers 800 and sellers 804 collaborate (i.e., expand or reduce) on an exchange schema and generate product taxonomy instantiations. The market exchange operators may control the marketplace 802, which may be a web site. In a block 814, the market exchange operator manages the exchange taxonomy (catalog schema) and taxonomy instantiations resulting from the buyers' collaboration 806 and the sellers' collaboration 830 on the baseline taxonomy, (e.g., the UNSPSC, eClass or RNTD, etc. taxonomy) in the marketplace 802. In a block 816, the exchange operator 802 creates exchange product numbers (EPNs) and posts the EPNs as net changes to the marketplace/exchange catalog.

In a block 808, the buyers 800 classify buyer's internal part numbers (IPNs) into the buyer's BTF catalog schema/taxonomy. In a block 818, the marketplace 802 operator publishes catalog updates or changes, which can be downloaded to buyers' or sellers' BTF catalogs. In a block 832, the sellers 804 classify vendor part numbers (VPNs) (which could also be called MPNs) into a supplier's BTF catalog schema/taxonomy. In a block 834, the sellers 804 create a VPN/EPN link, e.g., where the EPN is modeled in a Sales and Distribution (SD) system as a Customer Part Number linked to a VPN.

In a block 810, the buyers 800 create a buyers' internal part number to EPN link, e.g., in an SAP Materials Management (MM) Purchasing Information Record or AMPL. In a block 812, the buyers 800 generate a forecast of requirements for the buyers' internal part number. When a buyer sends the forecast requirements to the market exchange, the buyer's system translates the buyer's internal part number into the EPN. In a block 820, the marketplace operator or a marketplace-based system 802 aggregates all forecasts for the same EPN (coming perhaps from different buyers) in the marketplace systems environment 802. In a block 822, the market exchange operators 802 may conduct an auction and generate an RFP or an RFQ. In a block 836, the sellers 804 check their availability status (also known as Available to Promise (ATP)) for their part number that is equivalent to the EPN in the RFP/RFQ document. In a block 838, the sellers 804 may produce a proposal or quotation sales document to send to the buyers 800 either directly or via the exchange 802.

FIG. 9 illustrates a schema (a.k.a. taxonomy) instantiation-based part number generation approach to multiple part numbers. All buy-side and sell-side participants may use EPNs. Buy-side systems that are on-ramps to the Market or Marketplace Exchange may map buyers' internal part numbers (BPNs) with EPNs. One or multiple buy-side systems may have more than one buyer internal part numbers for parts that are FFF equivalent. In this case, buyers separately map the FFF BPNs to the same FFF equivalent EPN. Examples of functions within a buy-side-of-the-exchange procurement system enabling BPN-to-EPN mapping are Purchase Information Records and Approved Manufacturers Parts List (AMPLs), as provided within SAP's R/3 Enterprise system. Most buy side systems may have similar functionality. Sell-side systems may map their internal seller part numbers (which may be MPNs if the seller is a manufacturer, or VPNs, if the seller is a distributor) to the EPN, where the EPN is entered as a Customer Part Number (CPN). An example of a function within a sell-side system enabling EPN to SPN mapping is the Customer Information Record, as provided within the R/3 Enterprise system. Most sell side systems may have similar functionality. With the customer info record, the EPN would be modeled as a Customer Part Number (CPN).

A buyer 900 may have different divisions or have acquired a company or companies, which can result in the buyer using different part numbers BTF for FFF equivalent items. For example, the buyer might link in separate purchasing information records or separate AMPLs Buyer Part Number A (BPNA) 906A and BPNB 906B to the same EPN1. This internal mapping results in the buyer's system automatically translating the buyers internal part numbers, for example, BPNA 906A and BPNB 906B, to the same EPN, for example, EPN1. A marketplace 902 uses an EPN, for example EPN1, which is a FFF equivalent to a Supplier Part Number Z (SPNZ) 910. Parts traded on the exchange require different EPNs, for example EPN1, EPN2, or EPN3, when the EPNs have different FFF, as specified by different corresponding taxonomy instantiations. EPN2 912 is a FFF equivalent to BPNC 914, SPNY 916A and SPNX 916B. EPN3 is a FFF equivalent to BPND 920 and SPNW 922.

As a result of the technique of modeling FFF equivalent EPNs and linking these to IPNs in the buy-side systems purchasing info records or AMPLs (or the buy side system's equivalent functionality), exchange based systems, for example demand aggregation 414A (FIG. 4), can use a single part number, the EPN, because the on-ramp procurement systems automatically translate their IPNs to EPNs on commerce documents sent to the market exchange environment. The technique of CPTI with resulting EPNs enables the same, universally understood EPN to appear on all commerce documents, for example purchase orders (POs) and sales orders (SOs). Just as the buy-side procurement systems translate from IPNs to EPNs in outbound e-commerce documents through standard purchasing information records or AMPLs, the EPNs are translated to sellers' part numbers (SPNs) on inbound commerce documents, through standard customer information record functionality. FIG. 11 illustrates a bill of materials (BOM) structure 1100 for a parent item 1102 and an AMPL 1124 for a component 1112 of the parent item 1102. In one example, the BOM structure 1100 may be implemented behind-the-firewall by SAP R/3.

Thus, as shown above, the technique of CPTI and the Exchange Part Number (EPN) may serve as a semantics lynchpin in the supply chain by restoring the semantic disconnect resulting from buyers and sellers having different, mutually incomprehensible part numbers for items which are FFF equivalents.

Although mySAP enterprise system examples are shown and described above, CPTI could be integrated in a network of heterogeneous e-selling and e-procurement and enterprise computer systems. E-selling and e-procurement and Enterprise computer systems generally allow users to establish links and automatic conversion between internal part numbers (IPNs) and trading partners' part numbers. An example is the AMPL (Approved Manufacturers Parts List), where a user has linked an IPN for a component with several approved part numbers, including VPN1 1126A, MPN1 1126B, and EPN1 1126C (FIG. 11). After the user establishes the link in the AMPL 1124, the buyer's procurement system can "translate" the buyer's IPN into a seller's part number 1126A or 1126B or an EPN 1126C in purchasing documents sent to the seller. Another example is a purchasing information record that links an IPN with a vendor master record. Enterprise systems generally have equivalent functionality that works on both the buy side and the sell side.

However, to enable the buyer to populate the AMPL 1124 or a purchasing information record, or the seller to populate a customer information record, the buyer and seller have to communicate to determine that a buyer's IPN is an FFF equivalent to the seller's MPN. Without the CPTI process or an equivalent process where additional information is exchanged between buyers and sellers, neither buyer nor seller would be able to establish the link (or map) between their respective IPNs, VPNs and MPNs. Therefore, the automatic translation could not occur without CPTI or without some less efficient, less automated information exchange.

With CPTI, buyers may populate either the AMPL or the purchasing information record with the Exchange Part Number (EPN). Sellers would populate the customer information record, or their systems' equivalent function, with the EPN. The respective buy-side and sell-side systems would be able to automatically translate from the buyers' IPN to the EPN and from the EPN to the sellers' IPN, i.e., MPN or VPN.

A catalog content maintenance environment may be a software component that can create catalog content by maintaining a taxonomy 1000 (FIG. 10) and linking parts to taxonomy instantiations 1002. Taxonomy maintenance may refer to selection or specification of (a) classes 1012 to be included in a catalog 1010, (b) characteristics 1014 to be included in classes, and (c) values 1018 or ranges of values 1016 to be valid for characteristics 1014.

A "product taxonomy instantiation" is a taxonomy instantiation linked to a product (a.k.a. part).

Enterprises that utilize e-commerce technology (e-selling, e-procurement, public and private market exchanges) may have a large potential return on investment (ROI) when using e-commerce technology products to buy and sell direct and stockable MRO materials. However, the potential ROI in these technology products may not be fully realized if the e-commerce processes are not fully automated, but rather require participation of sales and procurement engineers to determine whether materials being traded are FFF equivalent.

The principles of CPTI may be applied to any manufacturing industry, such as semiconductors, computers, automotive, aerospace, defense, consumer goods, oil & gas, and apparel. Many industries are developing industry-specific taxonomies, which are useable as base taxonomies for CPTI. These industries may have direct materials and/or stockable maintenance, repair and overhaul (MRO) materials. The CPTI process may enable customers to realize significant ROI in stockable MRO and direct materials sales and procurement environments.

CPTI may be used by procurement engineers in purchasing companies, by sales engineers in selling companies and by operators of PTXs (Private Trading Exchanges).

A number of configurations have been described. Nevertheless, it will be understood that various modifications may be made without departing from the spirit and scope of the application. Accordingly, other embodiments are within the scope of the following claims.

| ACRONYMS | |
|---|---|
| AML - | appoved manufacturer's list |
| AMPL - | approved manufacturer's parts list |
| ATP - | available-to-promise |
| AVL - | Approved Vendors List |
| BOMs - | bill of materials |
| BTF - | behind the firewall |
| BW - | Business Information Warehouse |
| CEM - | contract electronics manufacturer |
| CMS - | contract manufacturing services |
| CPN - | customer part number |
| CPTI - | collaborative product taxonomy instantiation |
| CPTM or c-PTM - | collaborative product taxonomy management |
| CRM - | customer relationship management |
| c-Tax - | collaborative taxonomy |
| CTX - | consortia trading exchange |
| CW - | content workbench |
| DAB - | dynamic auctioning and bidding |
| DB/DA - | dynamic bidding, dynamic auctioning |
| EBP - | Enterprise Buyer Professional |
| EMS - | electronic manufacturing services |
| EPI - | exchange part identifier |
| EPN - | exchange part number |
| ERP - | enterprise resource planning |
| FFF - | form, fit, function |
| GTIN - | global trade item number |
| IPC - | Internet pricing and configurator |
| IPN - | internal part number |
| IPC - | SAP's Internet Pricing and Configuration |
| KB - | Knowledge Base |
| MM - | SAP R/3 Materials Management |
| MPN - | manufacturer's part number |
| MRO - | Maintenance, Repair and Operations |

| ACRONYMS | |
|---|---|
| MRP - | Materials Requirements Planning |
| ODM - | original design manufacturer - OEMs who no longer manufacture "in-house," but rather outsource manufacture of designed equipment to CEMs (Contract Electronics Manufacturers). |
| OED - | Original equipment designer |
| OEM - | original equipment manufacturer |
| OTF - | outside of the firewall |
| PEX - | private exchange |
| PIPs - | RosettaNet Partner Interface Processes |
| PLM - | product lifecycle management |
| PM - | plant maintenance |
| PO - | purchase order |
| PPV - | Purchase Price Variance |
| PTX - | private trading exhange |
| RFP - | request for proposal |
| RFQ - | request for quotation |
| RNTD - | RosettaNet Technical Dictionary |
| ROI - | return on investment |
| ROH - | raw or purchased |
| SCE - | sales configuration engine |
| SCM - | supply chain management |
| SD - | Sales and Distribution |
| SFA - | sales force automation |
| SO - | sales order |
| SRM - | Supplier Relationship Management |
| VAD - | value added distributor |
| VPN - | vendor's part number |
| xApp or X-App - | cross application |
| XML - | eXtensible markup language |
| xPTM - | cross-application Product Taxonomy Management |

What is claimed is:

1. A method comprising:
receiving at least two sets of attributes and values for a product through a communications network, each set of attributes representing quantifiable properties of the product and each set of values representing numerical quantities of the respective properties, wherein there is at least one difference between each of the sets of attributes and values;
forming a collaborative component taxonomy instantiation, the taxonomy instantiation comprising a union of distinct attributes and values obtained from the at least two sets of attributes and values;
associating a unique identifier with the formed collaborative component taxonomy instantiation;
comparing the union of product attributes and values in the collaborative component taxonomy instantiation to product catalog information received from different computing systems through a communications network;
associating the unique identifier with those matching products included in the received product catalog information based on the comparing; and
distributing the unique identifier and the association with a corresponding matching product to each computing system having product catalog information containing the corresponding matching product through the communications network, wherein the unique identifier is associated with each matching product at each computing system through the distributing.

2. The method of claim 1, further comprising determining whether an entity's computing system includes a product that is form, fit and function equivalent to the collaborative component taxonomy instantiation.

3. The method of claim 1, further comprising retrieving and displaying the identifier in response to a user search with key terms.

4. The method of claim 1, further comprising retrieving and displaying the taxonomy instantiation in response to a user search with a set of characters.

5. The method of claim 1, further comprising selecting a taxonomy.

6. The method of claim 5, further comprising selecting a class in the taxonomy.

7. The method of claim 5, further comprising selecting a plurality of attributes for the desired product from the taxonomy.

8. The method of claim 7, further comprising specifying values for the selected attributes.

9. The method of claim 1, further comprising linking an enterprise computing system's internal part number (IPN) to the identifier that represents the collaborative component taxonomy instantiation.

10. The method of claim 1, wherein the identifier is embedded in an electronic commerce document and sent via an exchange application to distribute the identifier.

11. The method of claim 10, wherein the identifier in the electronic commerce document is machine sensible.

12. The method of claim 1, further comprising sending an electronic request for quotation (RFQ), the request for quotation containing the identifier.

13. The method of claim 1, further comprising sending an electronic request for proposal (RFP), the request for proposal containing the identifier.

14. The method of claim 1, further comprising sending a sales proposal with the identifier.

15. The method of claim 1, further comprising receiving an electronic commerce request, accessing a set of characters in the request, and searching an electronic catalog to find a set of attributes and values that correspond to the set of characters.

16. The method of claim 1, further comprising searching a set of form, fit and function characteristics in the taxonomy instantiation to identify an actual product.

17. The method of claim 1, further comprising determining whether an entity offers an actual product that possesses a set of form, fit and function characteristics in the taxonomy instantiation.

18. The method of claim 1, further comprising generating an electronic purchase order (PO) with the identifier.

19. The method of claim 1, further comprising generating an electronic sales order (SO) with the identifier.

20. The method of claim 1, further comprising adding the collaborative product taxonomy instantiation to a catalog software application.

21. The method of claim 1, further comprising adding the identifier and collaborative product taxonomy instantiation to a catalog software application.

22. The method of claim 1, further comprising aggregating demand for form, fit and function equivalent components using the identifier.

23. A system comprising:
a memory;
a processing device; and
a communications network linked to the memory, the memory storing an electronic catalog comprising a plurality of collaborative taxonomy instantiations, each collaborative taxonomy instantiation comprising a union of distinct attributes and values obtained from at least two sets of attributes and values for a product through a communications network, each set of attributes representing quantifiable properties of the product and each set of values representing numerical quantities of the respective properties with at least one difference between each of the sets of attributes and values, and each collaborative taxonomy instantiation being linked to an exchange part number,
wherein the processing device is configured to: (i) compare the union of product attributes and values to product catalog information received from different computing systems through the communications network, (ii) associate respective exchange part numbers with those matching products included in the received product catalog information based on the comparing, and (iii) distribute the respective exchange part number and the association with a corresponding matching product to each computing system having product catalog information containing the corresponding matching product through the communications network, wherein the exchange part number is associated with each matching product at each computing system through the distributing.

24. The system of claim 23, being web accessible by at least one enterprise computing system.

25. The system of claim 23, the electronic catalog further comprising a taxonomy.

26. The system of claim 23, wherein the electronic catalog is operable to display lists of classes and characteristics.

27. The system of claim 23, wherein the electronic catalog is operable to display lists of products linked to taxonomy instantiations.

28. The system of claim 23, wherein the electronic catalog includes a search engine operable to search for content in the catalog.

29. The system of claim 28, wherein the search engine is operable to receive an exchange part number and identify a collaborative taxonomy instantiation associated with the exchange part number in the electronic catalog.

30. An article of manufacture including machine-readable instructions that, when executed at a processing device, cause the processing device to:
receive at least two sets of attributes and values for a product through a communications network, each set of attributes representing quantifiable properties of the product and each set of values representing numerical quantities of the respective properties, wherein there is at least one difference between each of the sets of attributes and values;
form a collaborative component taxonomy instantiation, the taxonomy instantiation comprising a union of distinct attributes and values obtained from the at least two sets of attributes and values;
associate a unique identifier with the formed collaborative component taxonomy instantiation;
compare the union of product attributes and values in the collaborative component taxonomy instantiation to product catalog information received from different computing systems through a communications network;
associate the unique identifier with those matching products included in the received product catalog information based on the comparing; and
distribute the unique identifier and the association with a corresponding matching product to each computing system having product catalog information containing the corresponding matching product through the communications network, wherein the unique identifier is associated with each matching product at each computing system through the distributing.

* * * * *